US012784465B2

(12) United States Patent
Bachmann

(10) Patent No.: US 12,784,465 B2
(45) Date of Patent: Nov. 3, 2026

(54) PROVIDE PARALLEL ROAD INFORMATION IN MAP TO IMPROVE SIGN FUSION ALGORITHMS

(71) Applicant: QUALCOMM Incorporated, San Diego, CA (US)

(72) Inventor: Michael Wolfgang Bachmann, Augsburg (DE)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 18/767,459

(22) Filed: Jul. 9, 2024

(65) Prior Publication Data

US 2026/0017953 A1 Jan. 15, 2026

(51) Int. Cl.
*G06V 20/58* (2022.01)
*G01C 21/28* (2006.01)

(52) U.S. Cl.
CPC .......... *G06V 20/582* (2022.01); *G01C 21/28* (2013.01)

(58) Field of Classification Search
CPC .............................. G06V 20/582; G01C 21/28
See application file for complete search history.

(56) References Cited

U.S. PATENT DOCUMENTS

2018/0227566 A1* 8/2018 Price ...................... B60K 35/53
2022/0028257 A1* 1/2022 Lindberg Nilsson ...................... G08G 1/0133

* cited by examiner

*Primary Examiner* — Adnan M Mirza
(74) *Attorney, Agent, or Firm* — Thien T. Nguyen

(57) ABSTRACT

Aspects presented herein may enable a UE to obtain information related to parallel roads to rule out inapplicable/irrelevant traffic signs. In one aspect, a UE detects at least one traffic sign is present on a set of parallel roads based on a set of images and map data. The UE identifies whether the at least one traffic sign is associated with a current path traveled by a vehicle based on the detection that the at least one traffic sign is present on the parallel roads. The UE outputs a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

16 Claims, 16 Drawing Sheets

PROVIDE PARALLEL ROAD INFORMATION IN MAP TO IMPROVE SIGN FUSION ALGORITHMS

TECHNICAL FIELD

The present disclosure relates generally to traffic sign detection, and more particularly, to traffic sign detection involving parallel roads.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus detects at least one traffic sign is present on a set of parallel roads based on a set of images and map data. The apparatus identifies whether the at least one traffic sign is associated with a current path traveled by a vehicle based on the detection that the at least one traffic sign is present on the parallel roads, where the current path is part of the set of parallel roads. The apparatus outputs a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
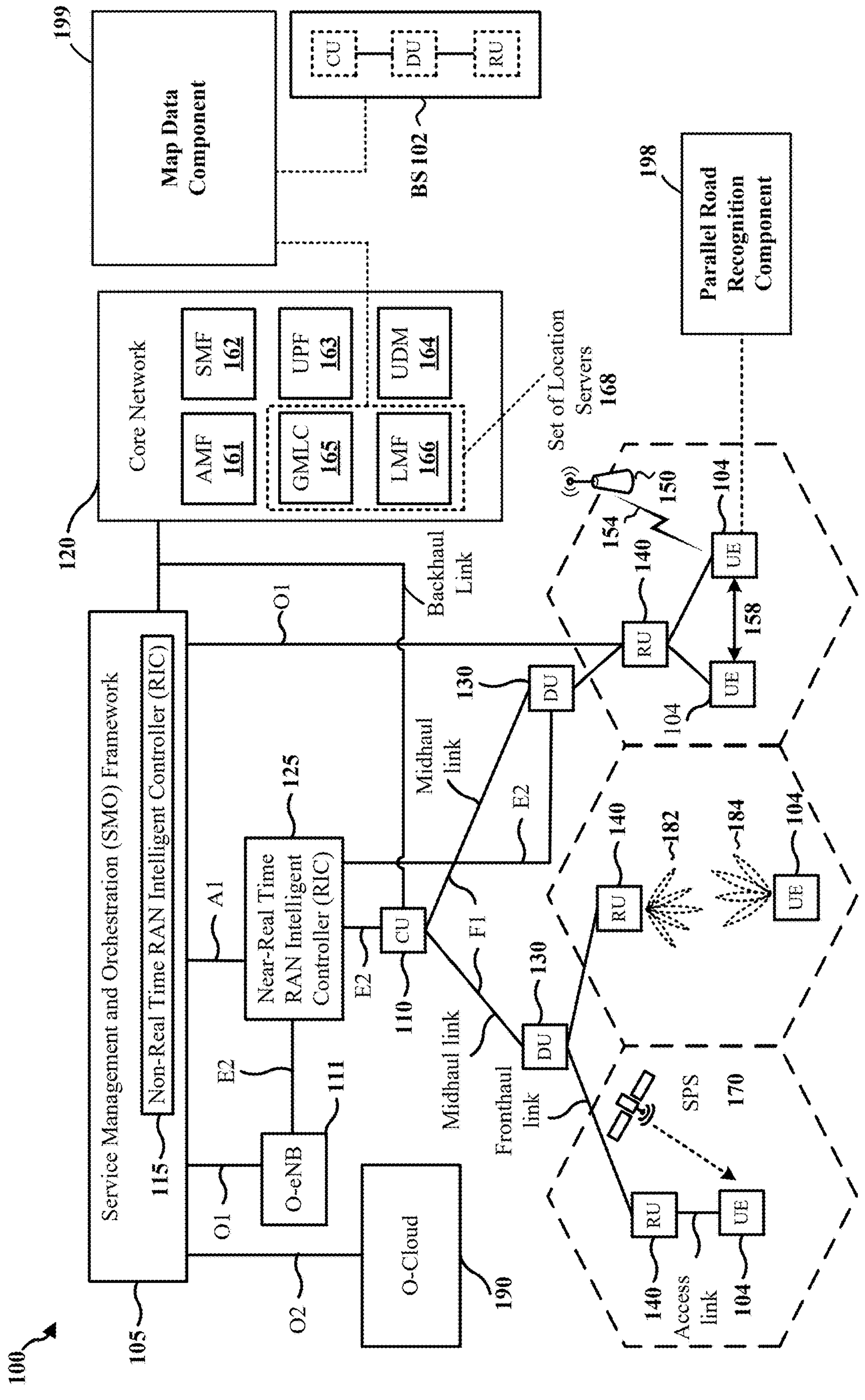
FIG. 1 is a diagram illustrating an example of a wireless communications system and an access network.

Aspects presented herein may improve the overall performance of systems/applications that are capable of detecting traffic signs (e.g., via one or more cameras), such as vehicles, on-board units (OBUs), advanced driver assistance systems (ADAS) systems, navigation systems, and/or assisted/autonomous driving systems, etc. (collectively as "user equipments (UEs)"). Aspects presented herein may enable UEs to obtain information related to parallel roads, such as the existence of the parallel roads, the speed limit of the parallel roads (e.g., the speed limit for each road in parallel roads), and/or other relevant traffic signs in map data. Then, the UE may use the obtained information improve the fusion algorithm(s) used by the UE to improve their performance and accuracy on ruling out inapplicable/irrelevant traffic signs (which may be referred to as "false positives.").

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a parallel road recognition component 198 that may be configured to detect at least one traffic sign is present on a set of parallel roads based on a set of images and map data; identify whether the at least one traffic sign is associated with a current path traveled by a vehicle based on the detection that the at least one traffic sign is present on the parallel roads, where the current path is part of the set of parallel roads; and output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle. In certain aspects, the base station 102 or the one or more location servers 168 may have a map data component 199 that may be configured to provide map data to the UE 104.

Figures 2A, 2B, 2C, 2D:
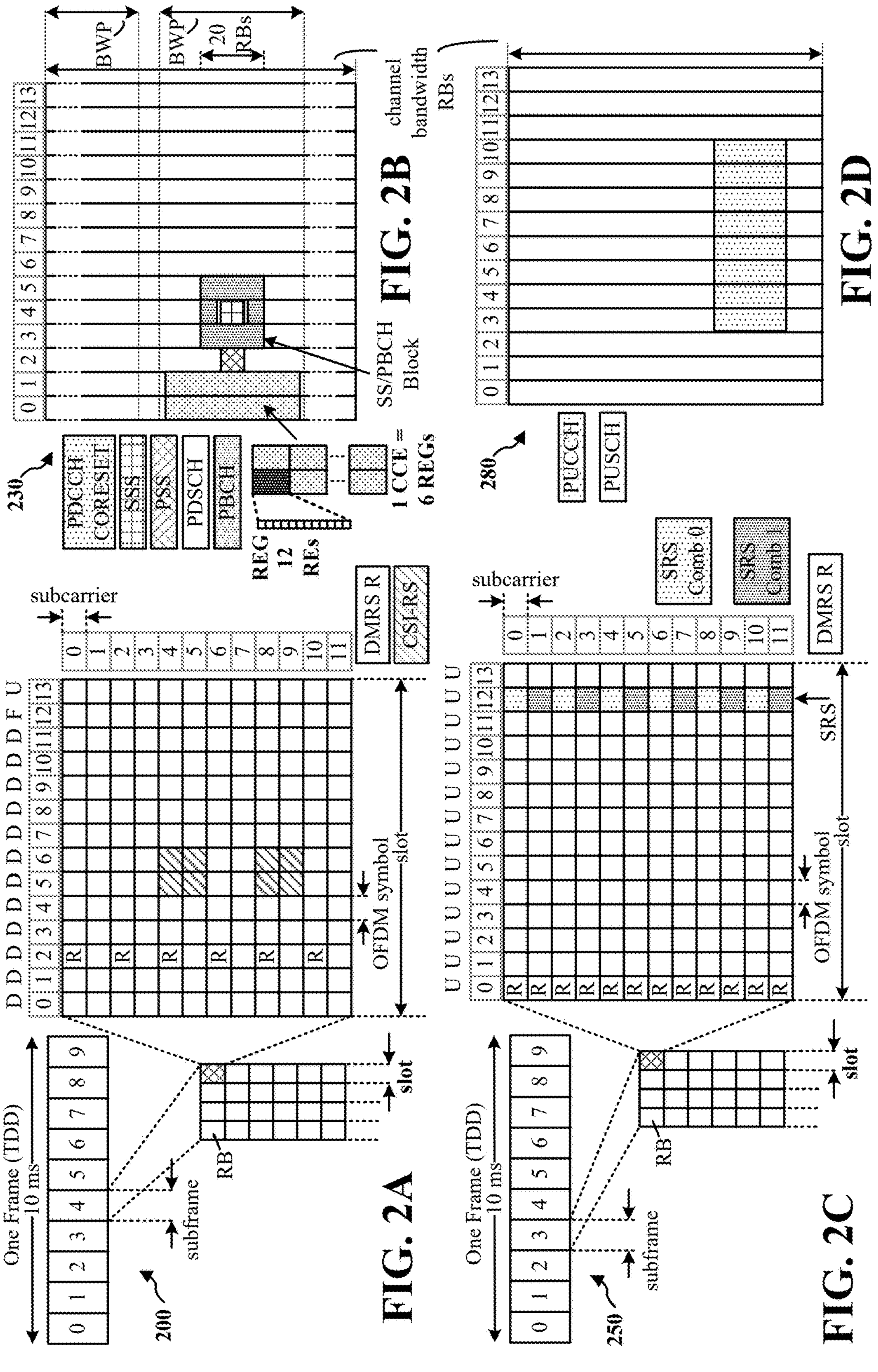
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2$\mu$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
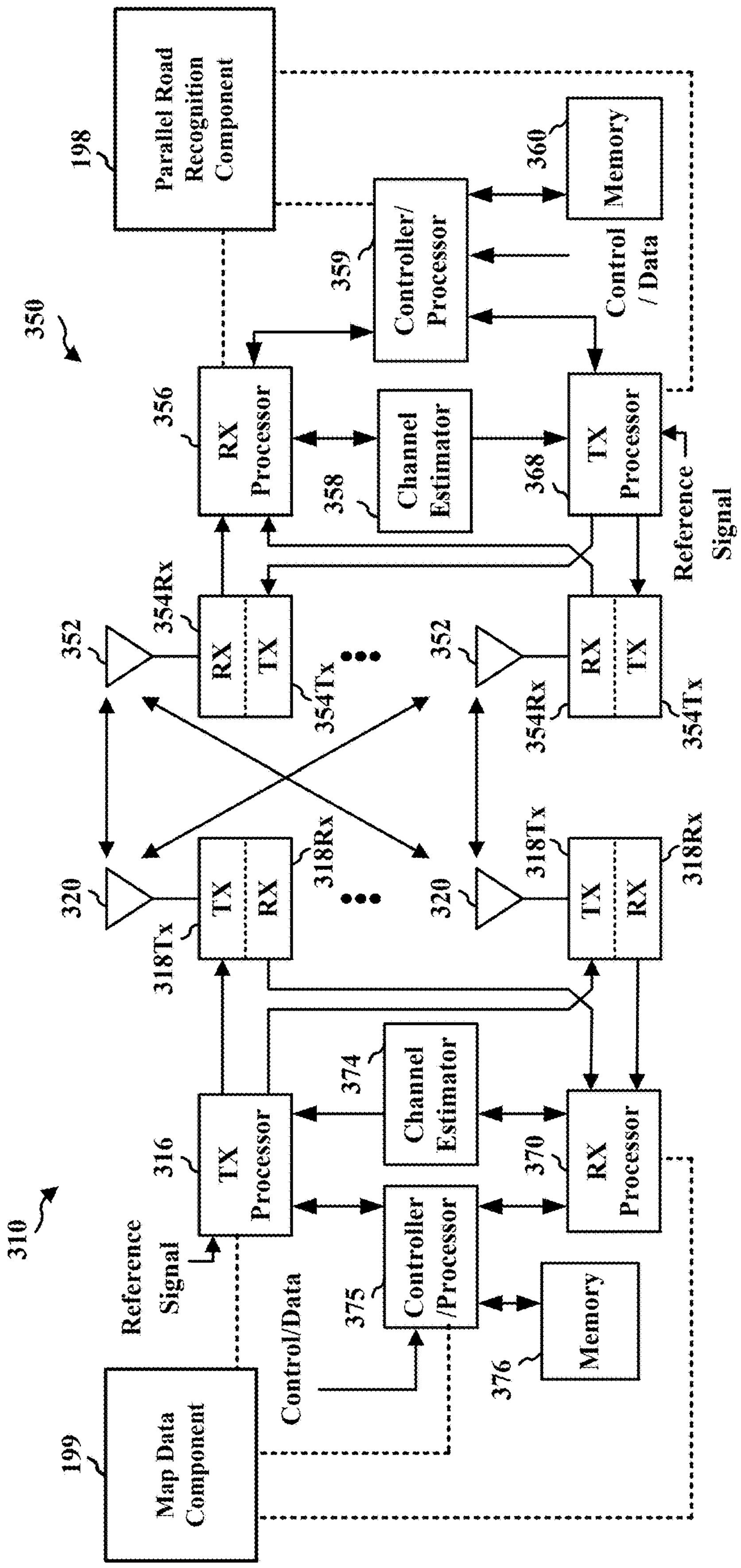
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the parallel road recognition component 198 of FIG. 1.

At least one of the TX processor 316, the RX processor 370, and the controller/processor 375 may be configured to perform aspects in connection with the map data component 199 of FIG. 1.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), such as camera(s), radar(s), light detection and ranging (lidar(s) or lidar sensor(s)), etc., and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., travelling from one place to another place without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

Note while some assisted/autonomous driving systems may demand the use of HD map data, there are also assisted/autonomous driving systems and information systems that may be configured not to use HD map data (e.g., due to costs). For example, the Society of Automotive Engineers (SAE) has defined six levels of driving automation, from Level 0 (no automation) to Level 5 (full automation). For Level 0 (no automation), the human driver may be responsible for all aspects of driving, and the system may provide warnings or momentary assistance but does not take control of the vehicle. Example features for SAE Level 0 may include automatic emergency braking, blind spot warnings, and lane departure warnings, etc. As such, SAE Level 0 may not specify using HD map data. For Level 1 (driver assistance), the vehicle may assist with either steering or acceleration/deceleration (but may not perform both simultaneously). The human driver is still responsible for most driving tasks and must be ready to take over at any time. Example features for SAE Level 1 may include adaptive cruise control or lane-keeping assistance (e.g. lane centering), etc. For Level 2 (partial automation), the vehicle may control both steering and acceleration/deceleration under certain conditions, but the human driver is requested to remain engaged and monitor the driving environment at all times. Example features for SAE Level 2 may include ADAS, adaptive cruise control and lane-keeping assistance at the same time, etc. For Level 3 (conditional automation), the vehicle may perform all driving tasks under specific conditions, and the human driver may not be specified to monitor the environment but must be ready to take over when requested by the system. Example features for SAE Level 3 may include traffic jam chauffeur, where the vehicle is capable of handling driving in traffic jams without driver intervention. For Level 4 (high automation), the vehicle is capable of handling all driving tasks within certain conditions or environments (geofenced areas). The system may operate without human intervention but may specify a human driver outside its operational domain. Example features for SAE Level 4 may include local driverless taxi and pedals/steering, etc. For Level 5 (full automation), the vehicle is capable of performing all driving tasks under all conditions, and does not specify the human driver at any time. Example features for SAE Level 5 may include fully autonomous vehicles with no steering wheel or pedals. In summary, SAE Level 0 may be defined as features to provide warnings and assistance. ADAS is usually SAE Level 1 and 2, while AD is considered SAE level 3 to 5. Aspects presented herein (described below) may apply to all levels of SAE, including SAE Level 0 (e.g., for speed warning). For purposes of the present disclosure, a system or information system that is used in associated with SAE Level 0 to Level 5 may collectively be referred to as a "vehicle system," which may encompass the assisted driving and the autonomous driving.

To enable a vehicle to be capable of providing assisted driving and/or autonomous driving, the vehicle may be configured to use various machine learning (ML) and/or neural network (NN) frameworks. An ML/NN framework may refer to a set of tools, libraries, and/or software components that are configured to provide a structured way to design, build, and deploy ML/NN models and applications. These frameworks may be able to simplify the process of developing ML/NN algorithms and applications by providing a foundation of pre-built functions, algorithms, and utilities. They may typically include features for data pre-processing, model training, evaluation, and/or deployment, etc. ML/NN frameworks may come in various programming languages, and they may be configured to cater to different types of machine learning tasks, including supervised learning, unsupervised learning, and/or reinforcement learning, etc. An ML/NN model may refer to a mathematical representation of a real-world process or problem, created using ML/NN algorithms and techniques. These ML/NN models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 4:
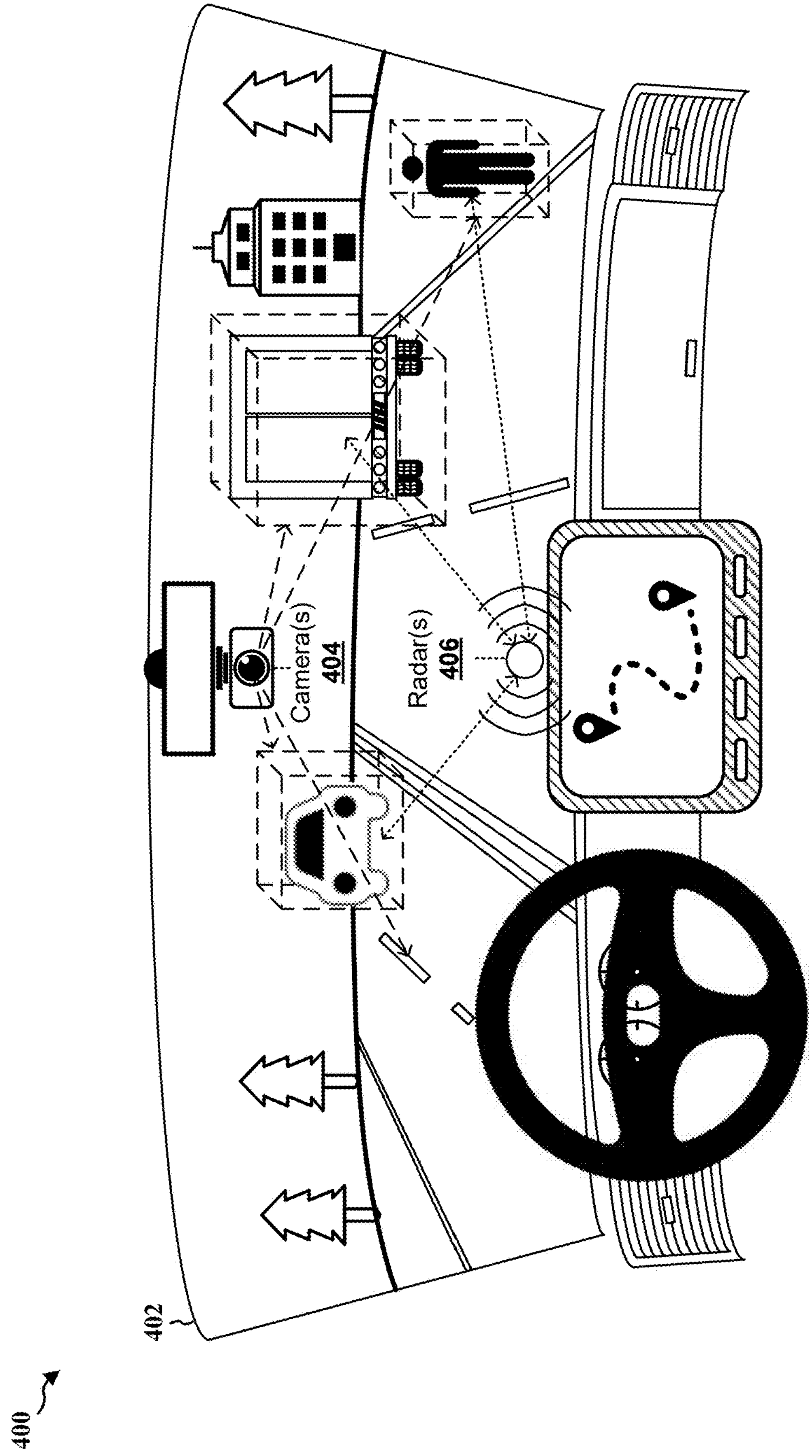
FIG. 4 is a diagram illustrating an example of a vehicle performing road object detection using different types of sensors in accordance with various aspects of the present disclosure.

FIG. 4 is a diagram 400 illustrating an example of a vehicle performing road object detection using different types of sensors in accordance with various aspects of the present disclosure. In some implementations, a vehicle system may be configured to perform road object detections using multiple types of sensors (and also one or more ML/NN models). For purposes of the present disclosure, a road object or a traffic participant may refer to an object that is related to roads and driving, and is typically/commonly used/considered by the vehicle system in providing assisted driving or performing autonomous driving. In some examples, the road object/traffic participant may also be referred to as a traffic-related object. For example, a road object/traffic participant may be another vehicle, a pedestrian, a cyclist/bicycle, an animal, a traffic cone, a traffic sign, a traffic light, traffic, a traffic lane, a traffic line, a vulnerable road user (VRU), an object that is within a threshold distance of the vehicle, and/or any objects that may typically present on the roads (e.g., on the driving paths of vehicles), etc. On the other hand, a non-road object or a non-traffic participant (which may also be referred to as a non-traffic related object) may refer to an object that is not related to roads and driving, and is typically/commonly not used/considered by the vehicle system in providing assisted driving or performing autonomous driving. For example, a non-road object/non-traffic participant may be an object that is not within a threshold distance of the vehicle (e.g., a house on the side of the road, a mountain that is far away), an object that is not typically presented on a driving path/road (an airplane, a fire hydrant, a tree, etc.), a structure that is typically not traversed by vehicles (e.g., a pedestrian bridge), etc. An ML/NN model may be trained to identify whether an object is a road object or a non-road object.

For example, as shown by the diagram 400, a vehicle or a vehicle system (collectively as a "UE 402") may be configured to use different types of sensors, such as a set of cameras 404 and/or a set of radars 406 for detecting road objects. For purposes of the present disclosure, the term "radar" may broadly refer to a device/component that is capable of detecting at least the presence and/or the distance of a physical object. Examples of radar may include an RF radar, a sonar, an ultrasonic sensor, a light detection and ranging (lidar), etc. In some implementations, the UE 402 may also use different MN/NN models for identifying different types of road objects. For example, a first ML/NN model may be trained/used to detect and track polylines from sensor output(s) (e.g., images captured by the camera(s) of the vehicle, point clouds generated from radar(s)/lidar(s), etc.), while a second ML/NN model may be trained/used to detect and track objects in a three-dimensional (3D) space (e.g., to perform 3D object detection (3DOD) tasks). Then, the outputs of different types of sensors (e.g., from the set of cameras 404 and the set of radars 406) may be processed and used by the ADAS or the autonomous driving system (e.g., for assisted/autonomous driving). A point cloud may refer to a discrete set of data points in space, where these points may represent a 3D shape or object. In some implementations, each point position may be associated with a set of Cartesian coordinates (X, Y, Z). Point clouds may be produced by radar(s)/lidar(s) by detecting multiple points on the external surfaces of objects.

As described in connection with FIG. 4, various applications (e.g., use cases) such as assisted driving and/or autonomous driving, may specify the use of map data. To keep the map data up-to-date, these applications (or devices running these applications) may be configured to download updated map data from a server from time to time or based on certain pre-defined conditions (e.g., when travelling to an area that is without map data). In some implementations, downloading map data from a server may be referred to as "map over the air" (MOTA).

Figure 5:
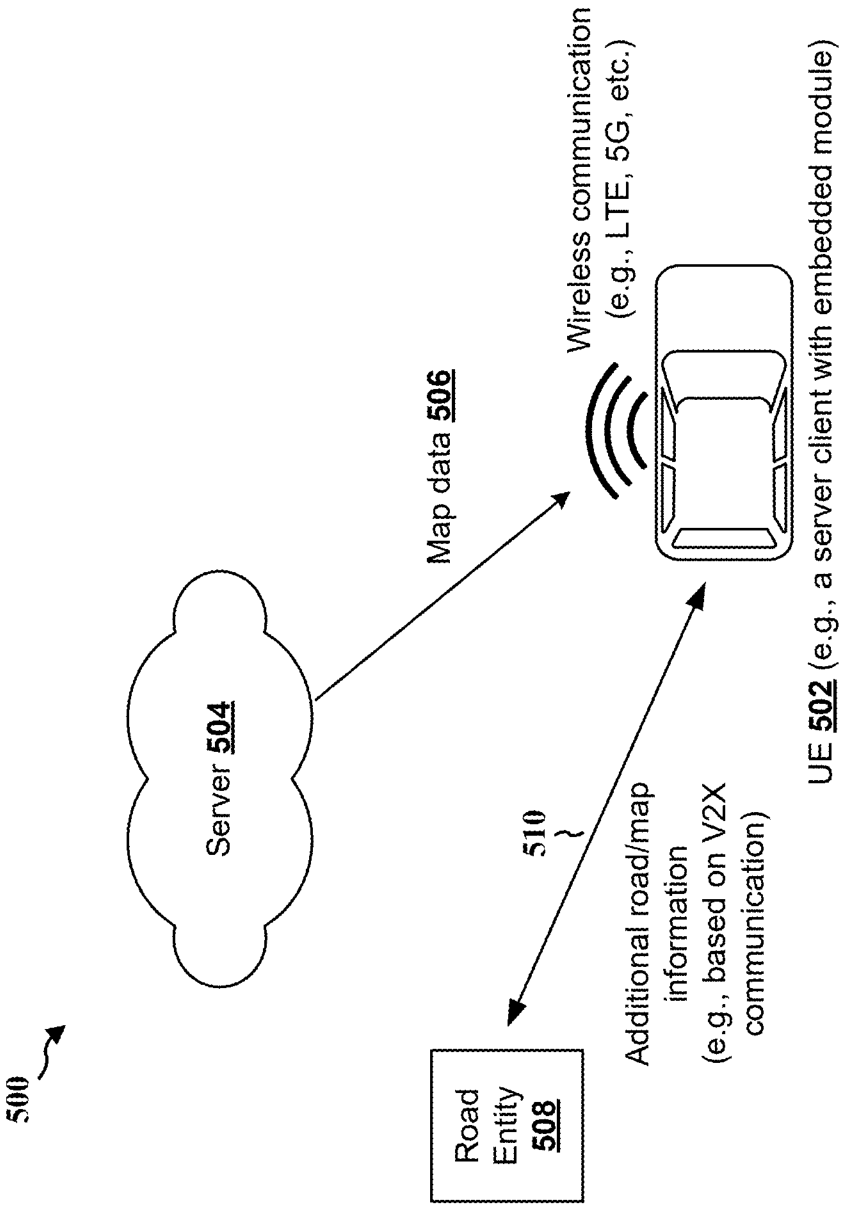
FIG. 5 is a diagram illustrating an example of a vehicle performing map over the air in accordance with various aspects of the present disclosure.

FIG. 5 is a diagram 500 illustrating an example of a vehicle performing map over the air in accordance with various aspects of the present disclosure. In one example, map over the air may refer to a process of a server 504 sending (real-time) map data 506 to a UE 502 (e.g., a vehicle, a vehicle system, an on-board unit (OBU) of the vehicle, a device running a navigation application, etc.) over a wireless network/communication (e.g., an LTE network, a 5G network, etc.), enabling the UE 502 to make decisions based on the latest information about the road and traffic conditions. Depending on implementations and conditions, different amount of map data 506 may be downloaded by the UE 502 from the server 504. For example, in some scenarios, the UE 502 may be configured to (1) download map data before driving, (2) download just updates for road conditions (e.g. traffic jams, construction work, etc.) while driving, (3) continuously download updated map data whenever available, or (4) a combination thereof (e.g., the UE 502 may download map data before driving, and continuously to download the updates while driving, including changes in map data (e.g. newly opened or closed street/highway, short term construction work). In some scenarios, the UE 502 may also be configured to stream the map data 506, which means the UE 502 does not download the map data before driving (e.g., the map data is streamed in real-time while the UE 502 is driving).

In a typical implementation, the map data 506 is transmitted from the server 504 (e.g., a cloud-based system), where the server 504 may utilize sensors and other data sources to collect and analyze information about the road network and traffic patterns. For example, the server 504 may receive and gather traffic/road information provided by a group of UEs (e.g., vehicles, roadside units (RSUs), etc.). In some examples, the information/data collected by a server from multiple UEs may be referred to as "fleet data" or "crowdsourced/crowdsourcing data." This data may be processed and combined with other data, such as GPS/GNSS and/or camera data from multiple users (e.g., from other UEs/vehicles and/or the UE 502) to create a detailed map of the environment in real-time. Then, an application (e.g., for autonomous driving, navigation, positioning, etc.) of the UE 502 may access the map data 506 over a wireless network (e.g., a cellular or satellite network), and use the map data 506 to make decisions about speed, route, and other factors, etc. For example, the UE 502 may use the map data 506 to avoid road construction, traffic congestion, or accidents, and to optimize its route for efficiency and safety, etc. In some examples, as shown at 510, the UE 502 may also be configured to receive (additional) road/map information from another road entity 508, such as from another vehicle/UE, a roadside unit (RSU), or a traffic/road infrastructure (e.g., traffic lights), such as based on vehicle-to-everything (V2X) communication protocol/technology.

Map data with lane-level information, such as road maps with lane-level connectivity, may play a crucial role in enhancing the safety, the efficiency, and/or the overall performance of autonomous driving systems and ADAS systems, and may also contribute to the realization of a safer and more connected transportation future. For purposes of the present disclosure, a map data with lane-level information/connectivity may be referred to as a "lane-map," a "lane-level map," "lane-map data," and/or "lane-level map data," etc., which may indicate that the map data includes information related to different lanes of a road. In addition, depending on the context, the term "map data" may be used interchangeably with the term "map."

Figure 6:
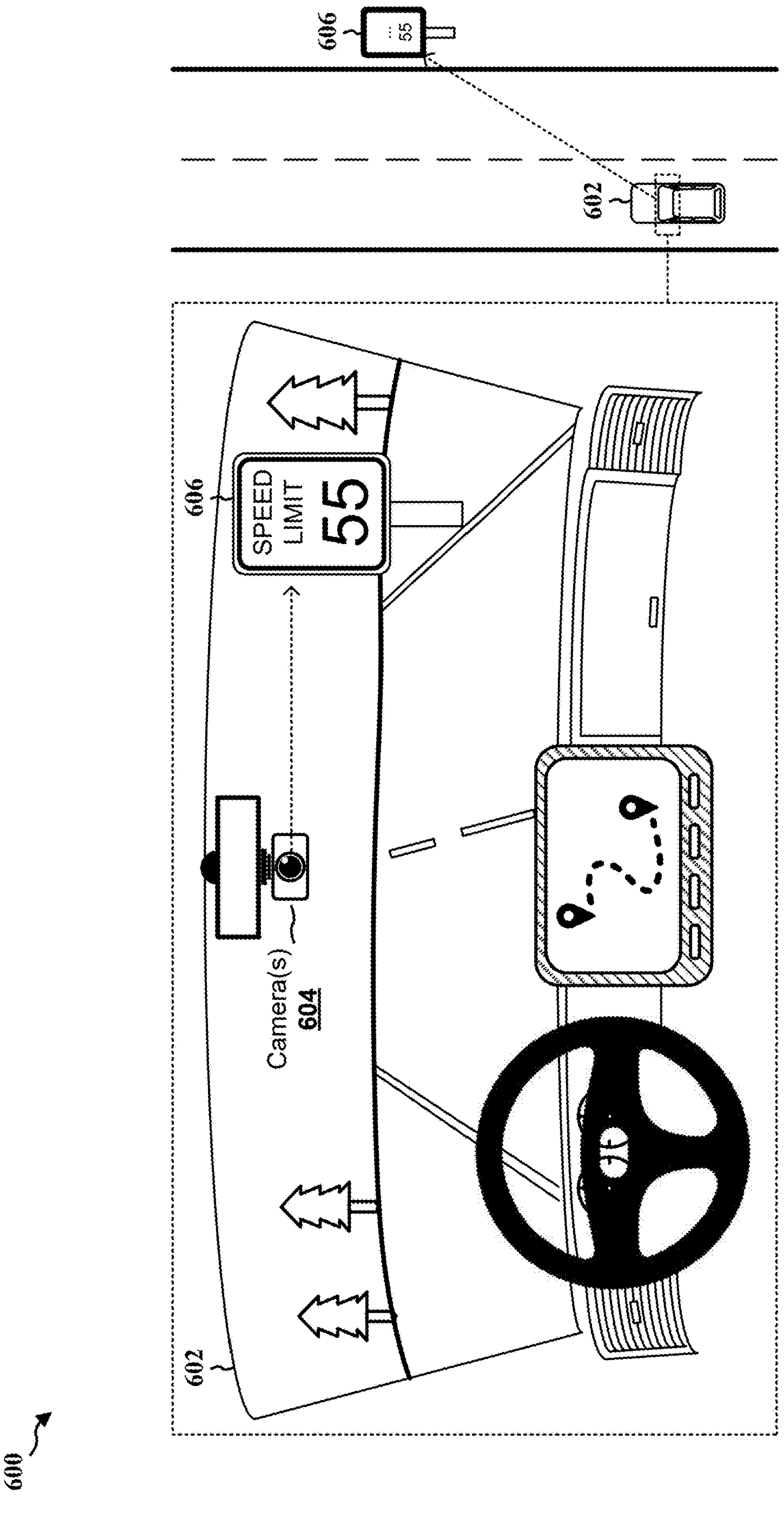
FIG. 6 is a diagram illustrating an example of a vehicle (or an assisted/autonomous driving system of the vehicle) recognizing a single traffic sign in accordance with various aspects of the present disclosure.

FIG. 6 is a diagram 600 illustrating an example of a vehicle (or an assisted/autonomous driving system of the vehicle) recognizing a single traffic sign in accordance with various aspects of the present disclosure. In some implementations, a vehicle (or its assisted/autonomous driving system) may have the capability to recognize traffic signs using its camera(s). Then, based on information obtained from the recognized traffic signs, the vehicle may make certain adjustments (e.g., for assisted/autonomous driving) and/or provide suitable warning(s) to the driver. For simplicity of the illustration, a vehicle, an assisted/autonomous driving system of the vehicle, an on-board unit (OBU) of the vehicle, and/or a mobile device (e.g., a smartphone running driving related application(s)), may collectively be referred to as a "user equipment (UE)." In addition, for purposes of the present disclosure, a "traffic sign" may refer to a sign that conveys information, an instruction, and/or a warning to drivers (typically related to roads and environments in proximity to or ahead of the drivers). For example, a traffic sign may include, and is not limited to, a stop sign, a yield sign, a speed limit sign, a no parking sign, a one-way sign, a no right-turn/left-turn/U-turn sign, a pedestrian crossing sign, a school zone sign, etc. In one example, as shown by the diagram 600, a UE 602 may be configured to use its camera 604 to recognize the speed limit signs on the road. When the UE 602 detects a speed limit sign 606 that indicates a speed limit for the current road (e.g., 55 miles per hour (MPH)), the UE 602 (or its assisted/autonomous driving system) may be configured to automatically reduce its speed to the speed limit (e.g., to 55 MPH), and/or provide a warning to its driver regarding the speed limit if the driver is driving above the speed limit.

Figure 7A:
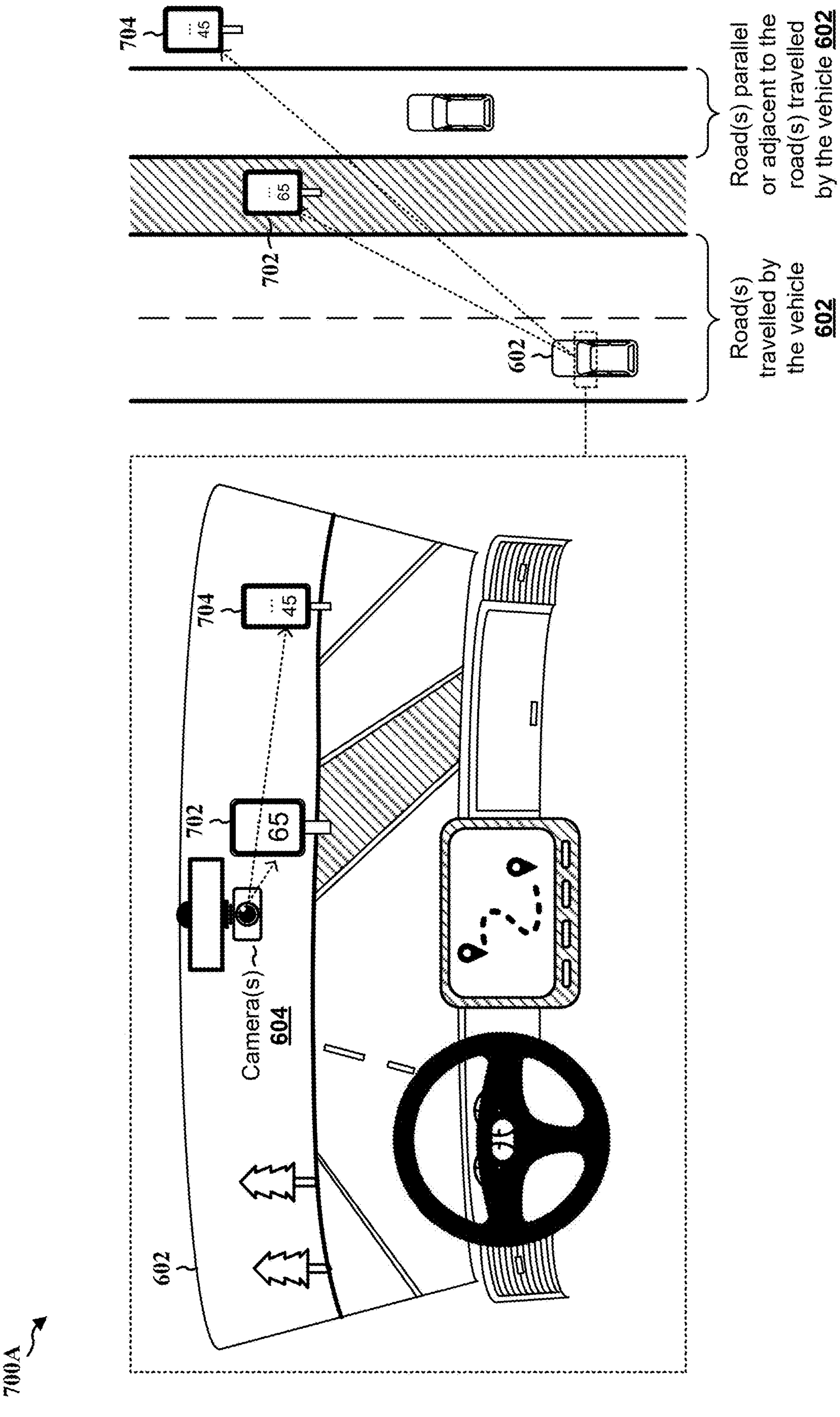
FIG. 7A is a diagram illustrating an example of a vehicle recognizing multiple traffic signs in accordance with various aspects of the present disclosure.

FIG. 7A is a diagram 700A illustrating an example of a vehicle recognizing multiple traffic signs in accordance with various aspects of the present disclosure. In some scenarios, multiple traffic signs detected by the camera (e.g., a camera configured with a high confidence) of a vehicle may not be filtered out based on the lateral distance or the sign position. For example, as shown at 702, in some scenarios, when the UE 602 is travelling on a set of roads with a first speed limit (e.g., 65 MPH), there may be another set of roads that is parallel or adjacent to the road(s) travelled by the UE 602 with a different (second) speed limit (e.g., 45 MPH) as shown at 704. This may cause the UE 602 to select a wrong speed limit to apply. For example, the UE 602 may incorrectly apply the second speed limit (e.g., 45 MPH), such as reducing the speed of the vehicle to the second speed limit (e.g., 45 MPH) or provide an incorrect warning to the user. For purposes of the present disclosure, roads that are parallel or adjacent to each other but are associated with at least one different traffic rule, such as shown by FIG. 7A, may be referred to as "parallel roads" and/or "a set of parallel roads." While the parallel roads may have different traffic regulations, such as different speed limits and/or different minimum/maximum speed limits, they are not specified to be separated from each other by an object (e.g., by a road divider, a traffic island, etc.). For example, in some highways, different lanes may be assigned with different speed limits, and these lanes may also be considered as parallel roads for purposes of the present disclosure.

Figure 7B:
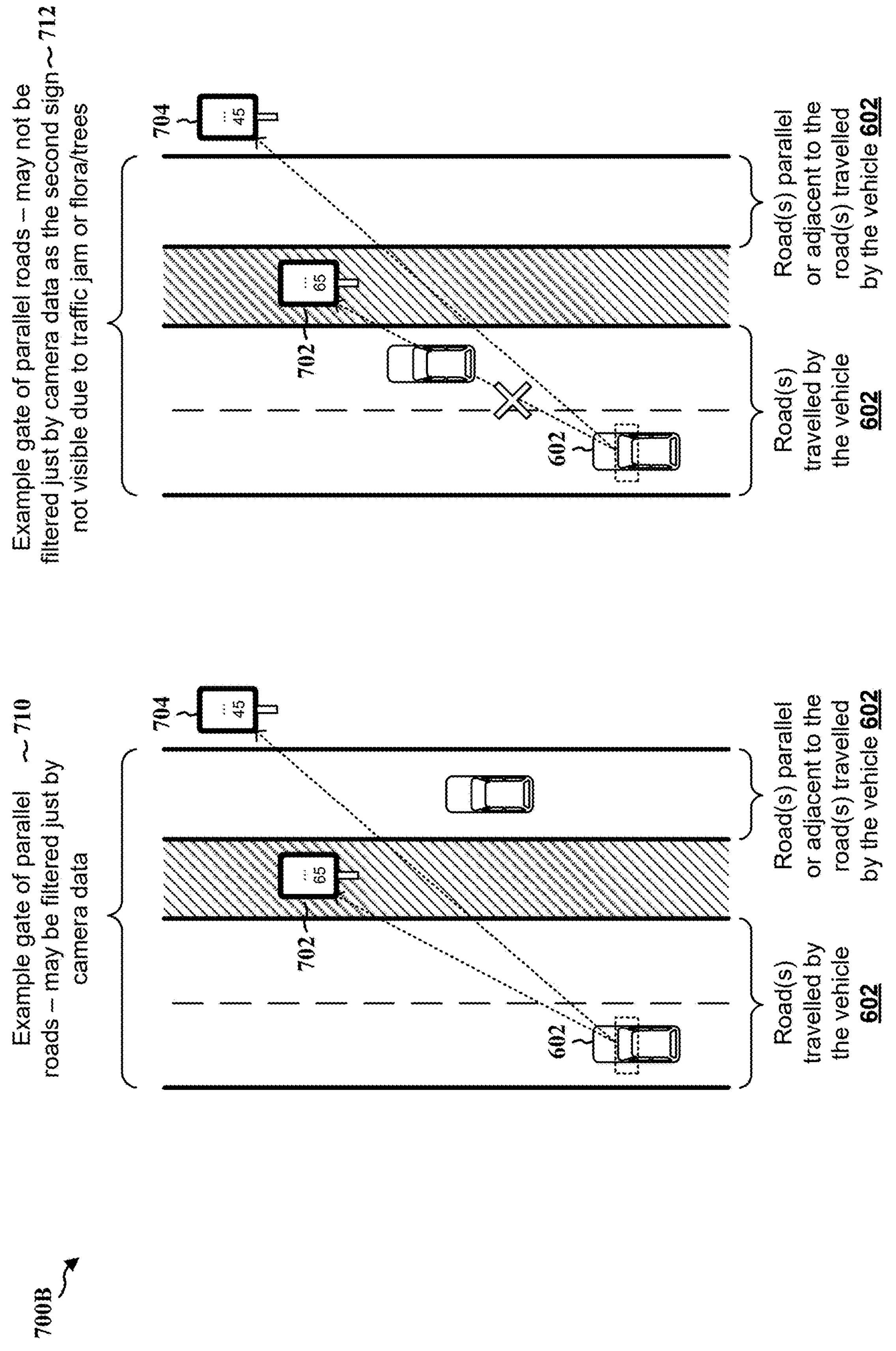
FIG. 7B is a diagram illustrating an example detection of signs valid for parallel roads in accordance with various aspects of the present disclosure.

FIG. 7B is a diagram 700B illustrating an example detection of signs valid for parallel roads in accordance with various aspects of the present disclosure. In some scenarios, the UE 602 may have the capability to filter invalid traffic sign(s) when multiple traffic signs are detected by the camera. For example, as shown at 710, when the UE 602 detects both traffic signs at 702 and 704, the UE 602 may be configured with an algorithm that is capable of filtering out one of the traffic signs based on the camera data. However, at shown at 712, when one of the signs is blocked (e.g., by another vehicle such as during a traffic jam or by a tree), the algorithm may not be triggered. As such, the UE 602 may not be able to filter out an invalid traffic sign.

Figure 7C:
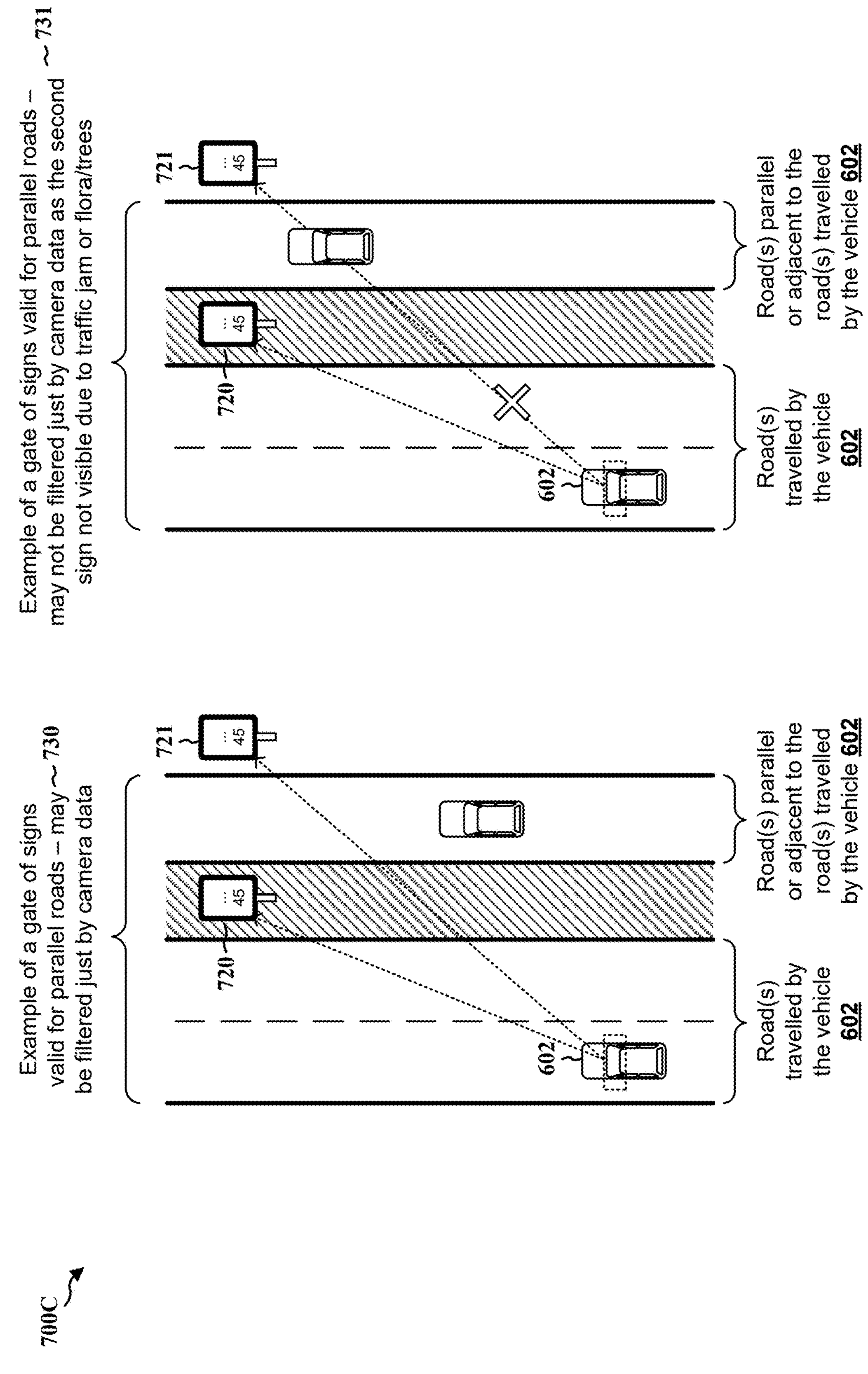
FIG. 7C is a diagram illustrating an example of a gate of signs valid for parallel roads in accordance with various aspects of the present disclosure.

FIG. 7C is a diagram 700C illustrating an example of a gate of traffic signs valid for parallel roads in accordance with various aspects of the present disclosure. For purposes of the present disclosure, a gate of traffic signs may refer to identical traffic signs that are on the left and right of a road, and the signs may be parallel (or nearly parallel) to each other. For examples, a gate of signs may be a speed limit sign of 45 MPH that is on both the left and right of a road, or a stop/yield sign that is on both the left and right of a road such as depicted by the diagram 700C. However, a gate of signs does not include different traffic signs on both the left and right of a road, e.g., a speed limit sign of 65 MPH on the left of the road and a speed limit sign of 45 MPH on the right of the road, or a stop sign on the left of the road and a yield sign on the right of the road, etc. In some scenarios, the UE 602 may have the capability to filter invalid traffic sign(s) from a gate of traffic signs detected by the camera. For example, as shown at 730, when the UE 602 detects both traffic signs at 720 and 721 that are approximately parallel to each other, the UE 602 may be configured with an algorithm that is capable of filtering out one of the traffic signs based on the camera data. However, at shown at 731, when one of the signs is blocked (e.g., by another vehicle such as during a traffic jam or by a tree), the algorithm may not be triggered. As such, the UE 602 may not be able to filter out an invalid traffic sign and may not be able to apply the valid traffic sign as well.

Figure 8:
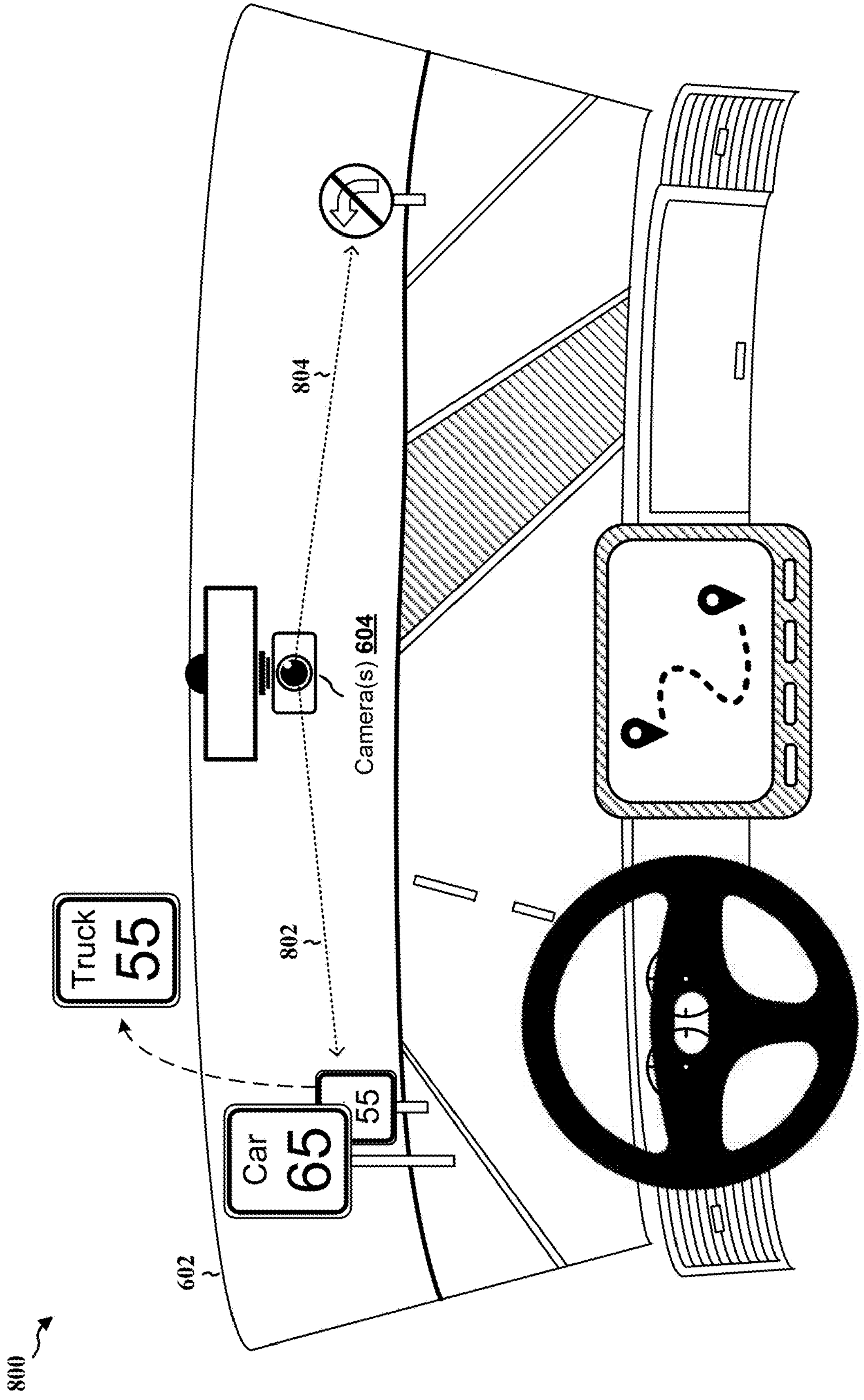
FIG. 8 is a diagram illustrating another example of a vehicle recognizing multiple traffic signs in accordance with various aspects of the present disclosure.

FIG. 8 is a diagram 800 illustrating another example of a vehicle recognizing multiple traffic signs in accordance with various aspects of the present disclosure. In another example, as shown at 802, the UE 602 may detect multiple traffic signs on the (same) road travelled by the UE 602, such as different speed limits for different types of vehicles (e.g., 65 MPH for regular vehicles and 55 MPH for trucks or large vehicles). If a sign (e.g., the speed limit for trucks) detected by the UE 602 is partially obstructed, such as by another sign, the UE 602 may incorrectly interpret the sign (e.g., interpret that the speed limit of regular vehicles is 55 MPH) based on the camera data.

Similarly, as shown at 804, in addition to the speed limit signs, the UE 602 may also incorrectly detect other types of signs that are not associated with the road(s) travelled by the UE 602 based on the camera data. For example, the UE 602 may capture and detect a "no turning left" sign on a road parallel or adjacent to the road(s) travelled by the UE 602, and may incorrectly interpreting that the "no turning left" sign is applying to the road(s) travelled by the UE 602 (e.g., the UE 602 may fail to filter out the sign based on the camera data).

As described in connection with FIGS. 6 to 8, in some scenarios, signs from the same or parallel roads may be configured to be detected by a camera (or multiple cameras), such as a camera with a high confidence (e.g., a camera with accuracy/resolution above a threshold). In general, camera detections of objects (e.g., with and without AI/ML) may come with a confidence level/field describing how certain the detections are, such as how certain a detected traffic sign exist, or the type/content of the traffic sign (e.g., "speed limit 60," "no left turn," etc.). Depending on implementations, most systems may define a "high confidence" as larger than 50%, but for some systems it may also be greater than 80%. The confidential level specified for a task may be based on the implementations of a system. For example, in some systems, a confidence level of greater than 20% may be sufficient if a traffic sign is part of a gate of signs (e.g., as discussed in connection with FIG. 7C) or if it the traffic sign is backed up by map data. However, algorithms used for detecting the traffic signs (e.g., algorithms used by the UE 602) based on lateral distance, sign position, roadside and/or road edge distance may sometimes fail to filter out invalid signs (e.g., traffic signs from other road(s) in parallel/adjacent roads) as they may be configured to cover a lot of different situations. In addition, speed limits and traffic signs of parallel roads may not be provided by map data, or the map data may just provide speed limits of lanes/path a vehicle may reach or has passed. As such, in certain situations, traffic sign fusion and speed limit information functionality of a vehicle (or the assisted/autonomous driving system of the vehicle) may output the wrong limit or inapplicable signs.

Aspects presented herein may improve the overall performance of systems/applications that are capable of detecting traffic signs (e.g., via one or more cameras), such as vehicles, OBUs, ADAS systems, navigation systems, and/or assisted/autonomous driving systems, etc. (collectively as "user equipments (UEs)"). Aspects presented herein may enable UEs to obtain information related to parallel roads, such as the existence of the parallel roads, the speed limit of the parallel roads (e.g., the speed limit for each road in parallel roads), and/or other relevant traffic signs in map data. Then, the UE may use the obtained information improve the fusion algorithm(s) used by the UE to improve their performance and accuracy on ruling out inapplicable/irrelevant traffic signs (which may be referred to as "false positives.").

Figure 9:
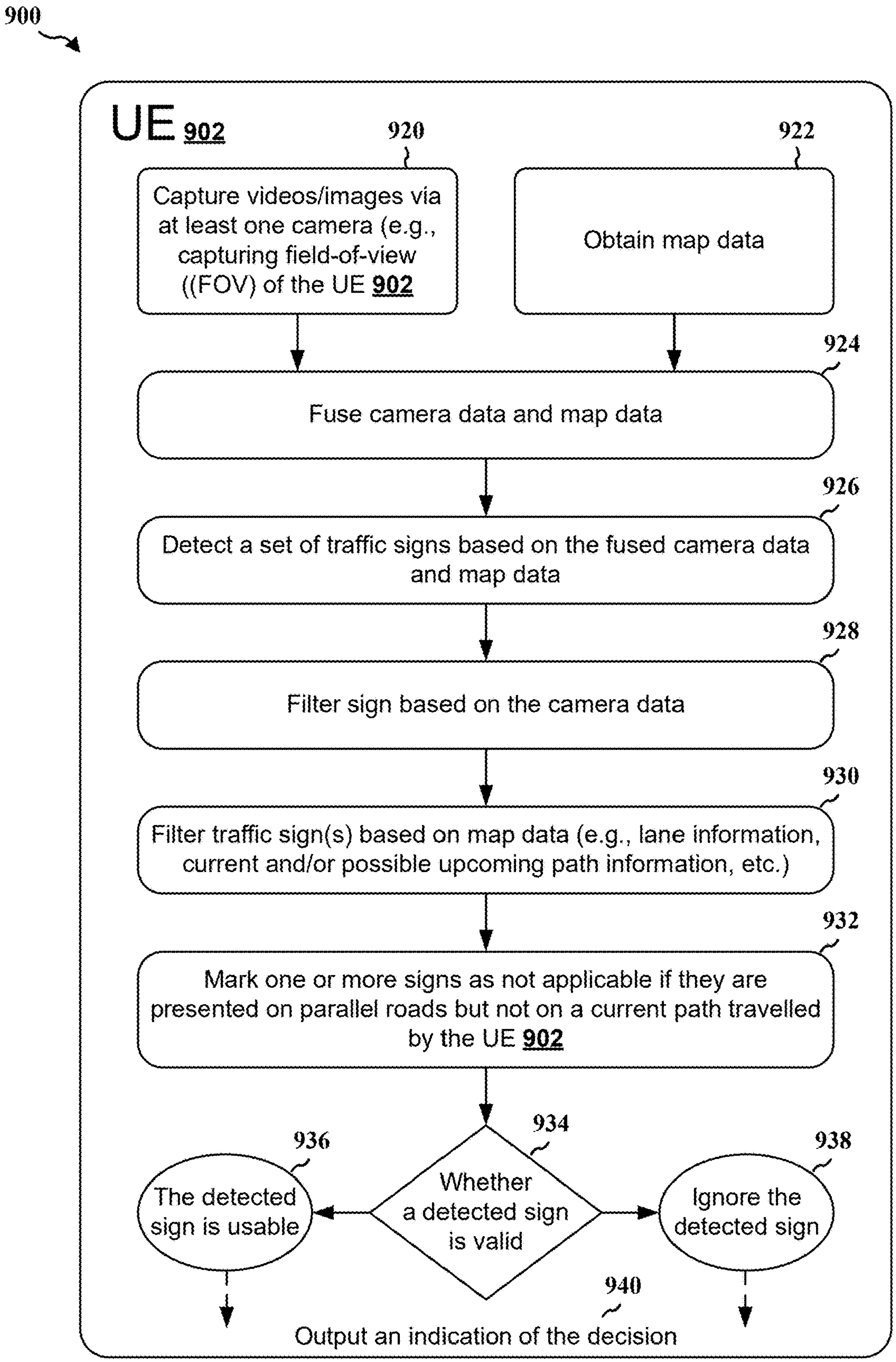
FIG. 9 is a diagram illustrating an example of a UE capable of using information related to parallel roads for filtering traffic signs in accordance with various aspects of the present disclosure.

FIG. 9 is a diagram 900 illustrating an example of a UE capable of using information related to parallel roads for filtering traffic signs in accordance with various aspects of the present disclosure. The arrangements of the various functions (e.g., boxes) performed by the UE described herein do not specify a particular structural or temporal order and are merely used as an illustration. Depending on implementations, the UE may be configured to perform some of the steps in different orders or with different components. By enabling map to include information related to signs of parallel roads when applicable, the performance of the algorithms deciding if a sign is valid for a UE (e.g., a vehicle) may be improved. Also, by enabling the UE to retrieve information of parallel roads (e.g., speed limit and other traffic signs), the capability of traffic sign fusion algorithms used by the UE to rule out invalid/inapplicable traffic signs from other road(s) in the parallel roads may be greatly improved. For purposes of the present disclosure, an "invalid traffic sign" or an "inapplicable traffic sign" used herein may refer to a traffic sign that is not related to or applicable to a current path/road travelled by a vehicle, such as traffic signs for other roads in the parallel roads not travelled by the vehicle, or for different types of vehicles. For example, as illustrated by the example in FIG. 7A, the second speed limit traffic sign shown at 704 (e.g., 45 MPH) may be considered as an invalid/inapplicable traffic sign to the UE 602 as it is unrelated to the road(s) travelled by the UE 602.

In one aspect, at 920, a UE 902 (e.g., the UE 502, 602, a vehicle, an assisted/autonomous driving system of the vehicle, an electronic control unit (ECU) of the vehicle, an OBU of the vehicle, an ADAS of the vehicle, a device running a navigation application, etc.) may be configured to use at least one camera to capture video(s)/image(s) of the UE 902's surrounding. For example, the UE 902 may use a front camera to capture the front "field-of-view (FOV)" of a vehicle (e.g., the vehicle associated with the UE 902 or the UE 902 itself). The captured video(s)/image(s) may also be referred to as the "camera data" for purposes of the illustration. For purposes of the present disclosure, an ECU, sometimes also known as an electronic control module (ECM), is an embedded system in automotive electronics that is capable of controlling one or more of the electrical systems or subsystems in a vehicle.

At 922, the UE 902 may obtain map data related to area(s) and/or road(s) in which the UE 902 is travelling, will be travelling, or has the possibility of travelling (e.g., in a 4-way intersection, a vehicle may travel up to 3 or 4 path (including U-turn)). For example, the map data may be HD map data that include information related to parallel roads (e.g., whether a specific section of roads include parallel roads such as described in connection with FIG. 7A.). The map data may be downloaded from a server (e.g., a map data server), or retrieved from at least one memory (if it is already stored in the UE 902).

At 924, the UE 902 may be configured to fuse the camera data (e.g., the captured video(s)/image(s)) with the map data. The fusion of the camera data with the map data may include associating the video(s)/image(s) captured by the UE 902 (e.g., by the camera(s) of the UE 902) with the corresponding area/road/section of the map data. For example, landmarks (e.g., traffic signs, stop lines, traffic lights, etc.) captured and detected by the camera at a specific set of coordinates may be fused (or linked) to the same type of landmark and set of coordinates with in the map data (e.g., an offset may be applied to the set of coordinates, which can be different depending on the landmark and situation). Another way of fusing camera detected speed limits with map data is based on current and upcoming speed limits as they are usually valid for complete links, roads, or lane lengths. In such cases, the value of the speed limit detected by camera at the set of coordinates is compared with the speed limit valid of the current or upcoming link, road or lane at that set of coordinates (an offset may also be applied here).

Figure 10A:
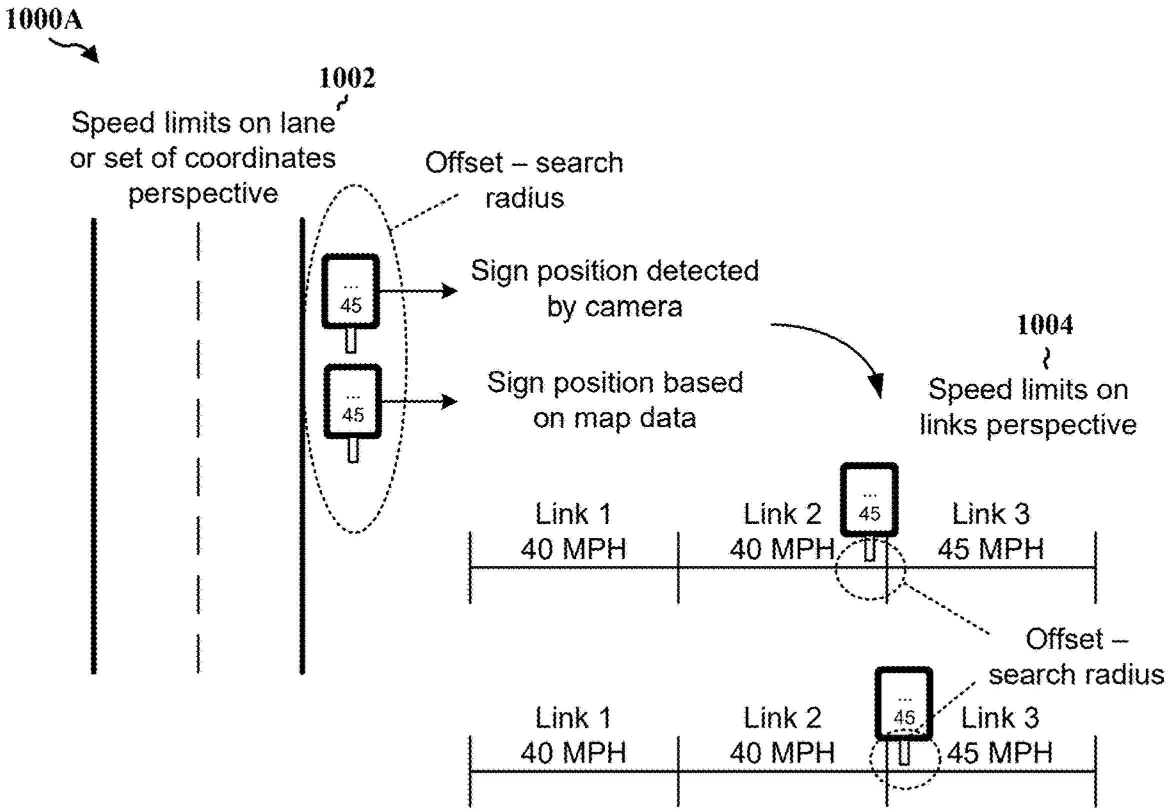
FIG. 10A is a diagram illustrating an example of fusion of camera data with map data where a detected landmark is within a search radius in accordance with various aspects of the present disclosure.

FIG. 10A is a diagram 1000A illustrating an example of fusion of camera data with map data where a detected landmark is within a search radius in accordance with various aspects of the present disclosure. In one example, as shown at 1002, a landmark (e.g., a speed limit traffic sign) detected by the camera of the UE 902 at a specific set of coordinates may be fused (or linked) to the same type of landmark and set of coordinates in map data, where an offset (e.g., a distance offset, a radius, etc.) may be applied. For example, if the offset is within a distance threshold, then the UE 902 may fuse the landmark captured by the camera with the landmark in the map data. In another example, as shown at 1004, another way of fusing camera detected speed limit with map data may be based on a current and upcoming speed limits as they are usually valid for complete links, roads, or lane lengths. For example, the value of the speed limit detected by the camera at the set of coordinates may be compared with the speed limit valid of the current or upcoming link, road or lane at that set of coordinates (an offset may also be applied here).

Figure 10B:
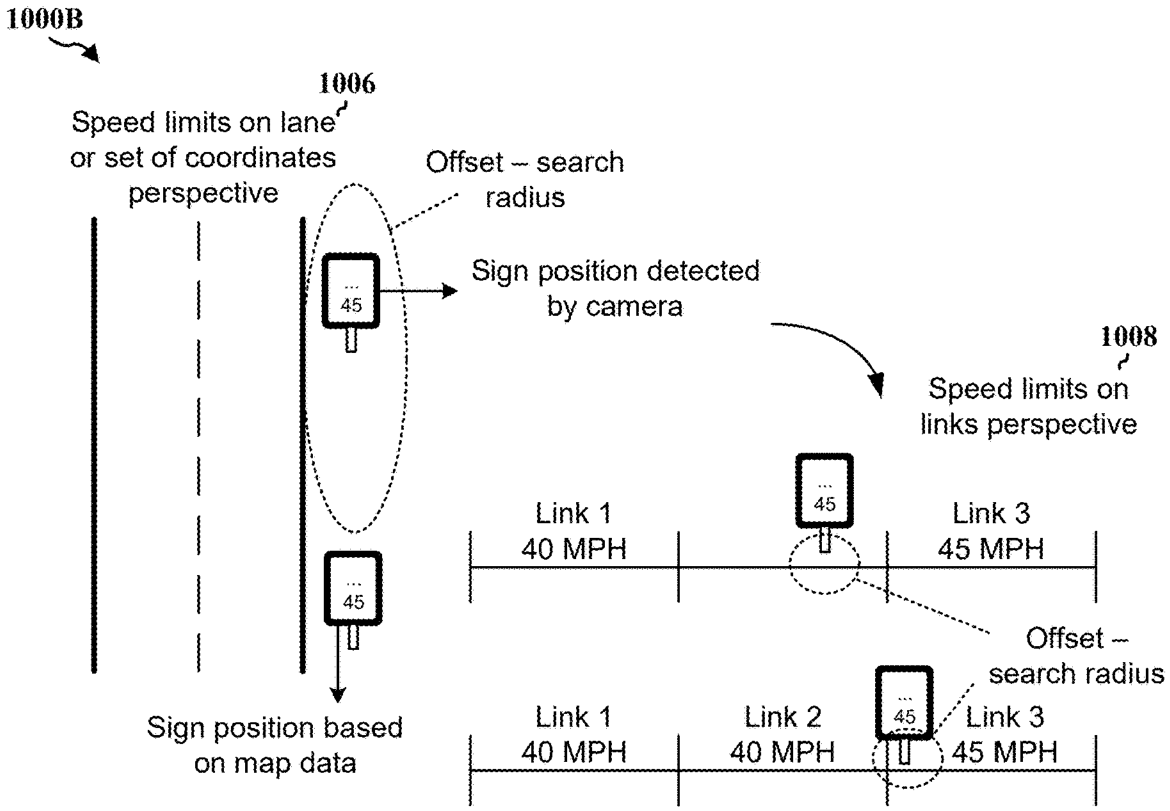
FIG. 10B is a diagram illustrating an example of fusion of camera data with map data where a detected landmark is not within a search radius in accordance with various aspects of the present disclosure.

FIG. 10B is a diagram 1000B illustrating an example of fusion of camera data with map data where a detected landmark is not within a search radius in accordance with various aspects of the present disclosure. In another example, as shown at 1006 and 1008, if a landmark (e.g., a speed limit traffic sign) detected by the camera of the UE 902 at a specific set of coordinates is not within the offset with a same/similar landmark in map data, then the UE 902 may be configured not to fuse (or link) them.

Referring back to FIG. 9, at 926, based on the fused camera data and map data, the UE 902 may detect a set of traffic signs based on the fused camera data and map data. For example, the camera data may indicate there are two speed signs in proximity to or ahead of the UE 902, and the map data may indicate there are three speed signs or a gate of signs in proximity to or ahead of the UE 902, etc.

At 928, in some implementations, the UE 902 may be configured to filter one or more invalid traffic signs (from the fused camera and map data) based on the camera data. For example, if the UE 902 is able to distinguish invalid traffic signs from just the video(s)/image(s) as they apparently are not applicable to the UE 902 (e.g., they are blurry, they apply to different types of vehicles other than the UE 902, they are not associated with the current path of the UE, etc.), the UE 902 may filter out these invalid signs first.

At 930, in some implementations, the UE 902 may be configured to filter traffic sign(s) (from the fused camera and map data) based on map data, such as based on lane information, current and/or possible upcoming path information, etc. For example, if the UE 902 is travelling on a highway, the UE 902 may filter out traffic signs that typically do not appear on a highway, such as a stop sign, a right-turn/left-turn/U-turn sign, a pedestrian crossing sign, a school zone sign, etc. based on the map data. In another example, the UE 902 may be configured to filter a sign(s) from a gate of signs based on the map data.

In another example, the UE 902 may be configured to filter out signs that are not plausible/compatible with the current traffic or the current road travelled by the UE 902. For example, if the UE 902 detects a speed limit traffic sign of 120 kilometers per hour in a traffic reduced zone, the UE 902 may determine the traffic sign is not plausible and ignore/filter out the traffic sign. In some examples, for the UE 902 to adopt this approach, just road data may be sufficient as it may contain road types/categories, and lane data provided by the map data may not be specified in this case.

At 932, the UE 902 may be configured to mark one or more traffic signs as invalid/inapplicable signs if they are present on parallel roads but not related to the current path travelled by the UE 902 (and/or mark one or more traffic signs as valid/applicable signs if they are present on the parallel roads and are related to the current path travelled by the UE 902). For example, the UE 902 may first detect that the UE 902 (or the vehicle associated with the UE 902) is travelling on a road where there is a set of roads parallel or in proximity to the road (which may be referred to as the "current road/path") travelled by the UE 902. The detection may be based on information from the map data or based on recognition from captured images/videos (e.g., if the UE 902 is capable of distinguishing the parallel roads from the images/videos). In some examples, the UE 902 may also be configured to detect a current path/road travelled by the UE 902. For example, the map data or captured images/videos may indicate that there are other road(s) parallel/in proximity to the current road/path travelled by the UE 902 (e.g., the UE 902 is travelling among one of parallel roads), and the UE 902 may identify/detect the current road/path it is using (e.g., such as based on a positioning mechanism) and label other road(s) in the parallel roads as invalid roads or roads not travelled by UE 902, etc. After the UE 902 identifies/labels the current road travelled by the UE 902 and/or the road(s) in the parallel roads not travelled by the UE 902, the UE 902 may detect whether there are any traffic signs on the road(s) not travelled by the UE 902, and the UE 902 may mark these signs as invalid signs. In some implementations, the UE 902 may also be configured to detect whether there is a gate of signs on road(s) not travelled by the UE 902, and the UE 902 may mark at least one of the gate of signs as invalid. In some implementations, the signs that are identified as invalid may be filtered/removed from the output interface of the UE 902 at 928, 930, and/or 932 (instead at 934 described below).

At 934, based on the filtering(s)/detection(s) performed at 928, 930, and/or 932, the UE 902 may identify whether one or more traffic signs (e.g., traffic signs that have not been filtered) are associated with the current path traveled by the UE 902 (or the vehicle associated with the UE 902). For example, referring to FIG. 7A, after the UE 602 detects and filter out the second speed limit sign shown at 704, the UE 602 may identify that the first speed limit sign shown at 702 is associated with the roads travelled by the UE 602.

If the UE 902 identifies a traffic sign is associated with the current path travelled by the UE 902 (and/or applicable to the UE 902), the UE 902 may mark that traffic sign as valid/usable as shown at 936. On the other hand, if the UE 902 identifies a traffic sign is not associated with the current path travelled by the UE 902 (and/or not applicable to the UE 902), the UE 902 may mark that traffic sign as an invalid/inapplicable traffic sign as shown at 938, and the UE 902 may be configured to ignore the invalid/inapplicable traffic sign(s).

In some implementations, as shown at 940, the UE 902 may also be configured to output an indication of whether one or more traffic signs are valid/invalid, such as output to various other/external application(s)/system(S) such as to a speed detection application/system (e.g., an application/system that detects or controls the speed of the vehicle), to a traffic information obtainment application/system (e.g., an application/system that obtains live traffic information for the vehicle), to a navigation application/system, to autonomous driving application/system, and/or to an assisted driving application/system, etc. Based n the indication, these application(s)/system(s) may decide whether to make adjustments for their applications (e.g., whether to apply one or more traffic signs to and/or filter one or more traffic signs from the speed detection, traffic information obtainment, navigation, autonomous driving, and/or assisted driving, etc.).

Figure 10C:
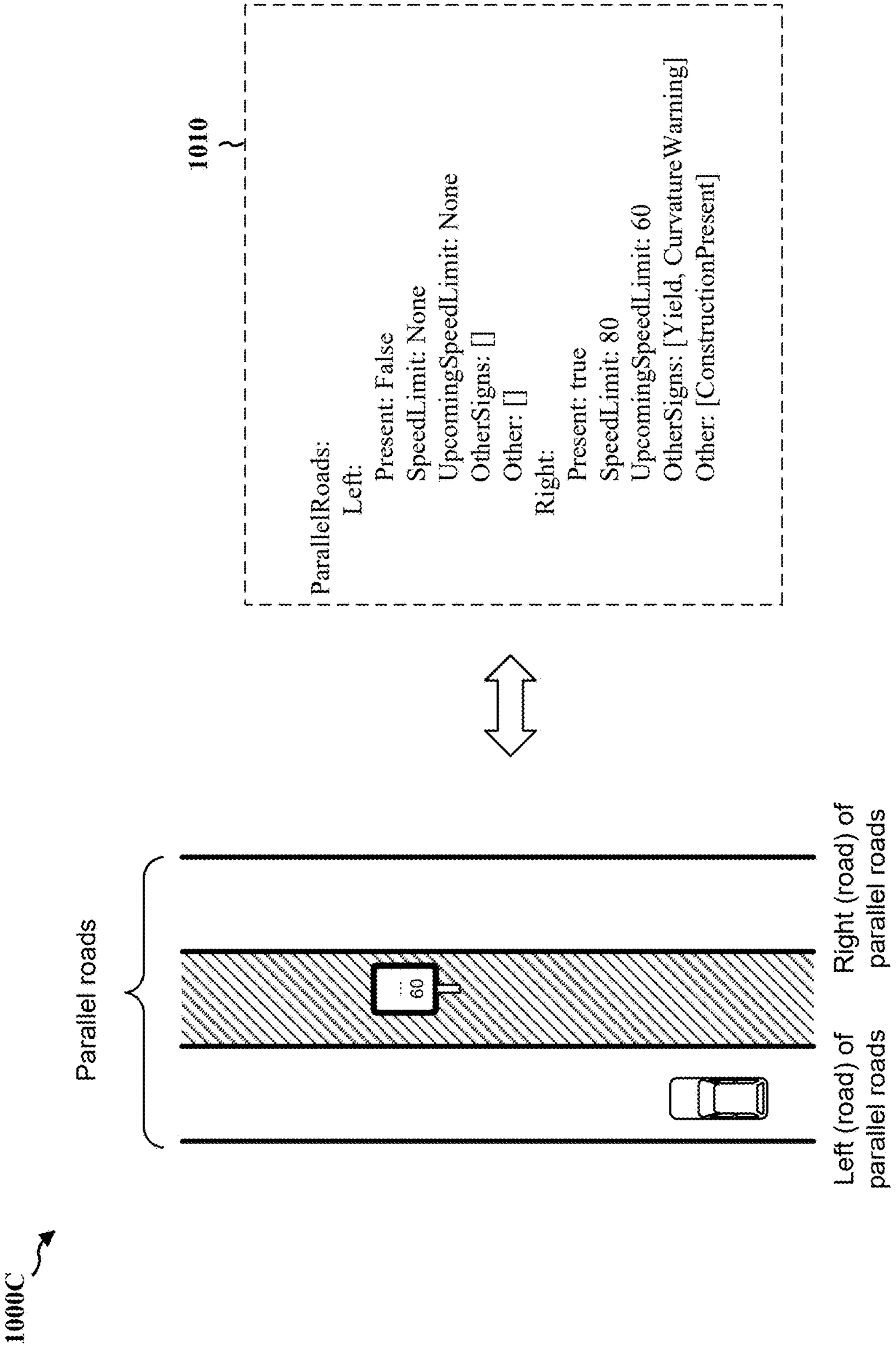
FIG. 10C is a diagram illustrating an example data structure for providing parallel roads information in accordance with various aspects of the present disclosure.

FIG. 10C is a diagram 1000C illustrating an example data structure for providing parallel roads information (e.g., via map data) in accordance with various aspects of the present disclosure. As shown at 1010, map data may be configured to include traffic sign information for parallel roads. For example, for two parallel roads that include a left road and a right road (e.g., from the perspective of a vehicle moving forward), the map data (for the corresponding section(s) of the parallel roads travelled by the vehicle) may indicate that the right road of the parallel roads has an upcoming speed limit of 60 MPH or kilometers per hour (KPH) and/or any additional traffic sign(s) (e.g., yield signs, curvature warning, construction signs, etc.). Then, based on this information, the vehicle may filter signs irrelevant to the current path/road travelled by the vehicle, such as described in connection with FIG. 9. Note the example data structure described herein is merely for illustration purposes, and does not exclude other types of data structures or interfaces. For example, there may be a different interface for speed limits, miscellaneous signs and other useful information. In that case, the information for parallel roads may be split and provided through different interfaces.

Aspects presented herein are directed techniques for improving sign fusion algorithm in ADAS. Aspects presented herein may enable adding map information with respect to parallel roads (e.g., speed limit or other relevant signs) to be used by the fusion algorithms to filter out information that are not relevant/applicable to the ego vehicle (e.g., ruling out false positives). For example, aspects presented herein may enable UEs to obtain information related to parallel roads, such as the existence of the parallel roads, the speed limit of the parallel roads (e.g., the speed limit for each road in parallel roads), and/or other relevant traffic signs in map data. Then, the UE may use the obtained information improve the fusion algorithm(s) used by the UE to improve their performance and accuracy on ruling out inapplicable/irrelevant traffic signs.

Figure 11:
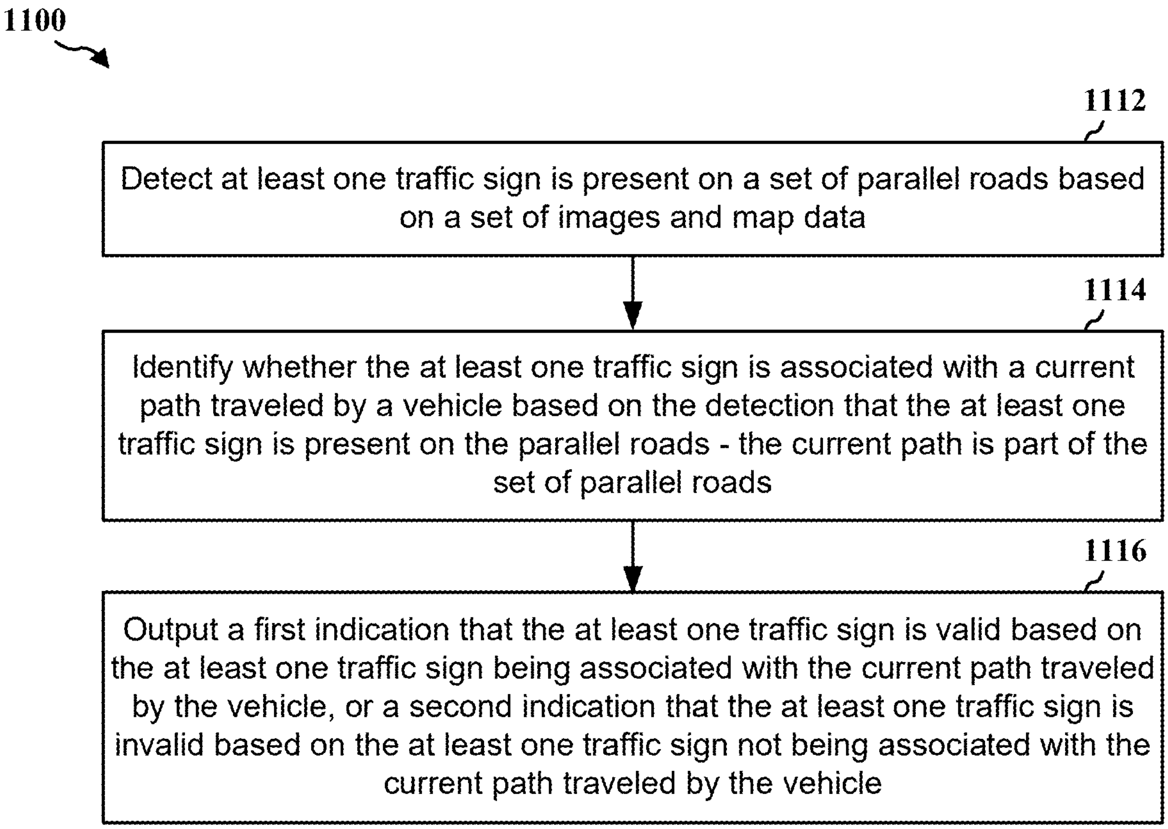
FIG. 11 is a flowchart of a method of object detection.

FIG. 11 is a flowchart 1100 of a method of object detection at a user equipment (UE). The method may be performed by a UE (e.g., the UE 104, 402, 502, 602, 902; the apparatus 1304). The method may enable the UE to obtain information related to parallel roads to improve the performance and accuracy of the UE on ruling out inapplicable/irrelevant traffic signs.

At 1112, the UE may detect at least one traffic sign is present on a set of parallel roads based on a set of images and map data, such as described in connection with FIG. 9. For example, at 926, based on the fused camera data and map data, the UE 902 may detect a set of traffic signs based on the fused camera data and map data. The detection of the at least one traffic sign may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

At 1114, the UE may identify whether the at least one traffic sign is associated with a current path traveled by a vehicle based on the detection that the at least one traffic sign is present on the parallel roads, where the current path is part of the set of parallel roads, such as described in connection with FIG. 9. For example, at 932, the UE 902 may be configured to mark one or more traffic signs as invalid/inapplicable signs if they are present on parallel roads but not related to the current path travelled by the UE 902 (and/or mark one or more traffic signs as valid/applicable signs if they are present on the parallel roads and are related to the current path travelled by the UE 902). For example, the UE 902 may first detect that the UE 902 (or the vehicle associated with the UE 902) is travelling on a road where there is a set of roads parallel or in proximity to the road (which may be referred to as the "current road/path") travelled by the UE 902 . . . and the UE 902 may identify/detect the current road/path it is using (e.g., such as based on a positioning mechanism) and label other road(s) in the parallel roads as invalid roads or roads not travelled by UE 902, etc. The identification of whether the at least one traffic sign is associated with a current path traveled by a vehicle may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

At 1116, the UE may output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle, such as described in connection with FIG. 9. For example, at 934, based on the filtering(s)/detection(s) performed at 928, 930, and/or 932, the UE 902 may identify whether one or more traffic signs (e.g., traffic signs that have not been filtered) are associated with the current path traveled by the UE 902 (or the vehicle associated with the UE 902). In some implementations, as shown at 940, the UE 902 may also be configured to output an indication of whether one or more traffic signs are valid/invalid. The output of the first indication and/or the second indication may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, to output the first indication that the at least one traffic sign is valid based on the at least one traffic sign being associated with the current path traveled by the vehicle, the UE may be configured to use the at least one traffic sign for at least one of speed detection, traffic information obtainment, navigation, autonomous driving, or assisted driving. In some implementations, to output the second indication that the at least one traffic sign is invalid based on the at least one traffic sign not being associated with the current path traveled by the vehicle, the UE may be configured to refrain from using or filtering the at least one traffic sign for at least one of speed detection, traffic information obtainment, navigation, autonomous driving, or assisted driving. In some implementations, to output the first indication or the second indication, the UE may be configured to transmit the first indication or the second indication, or store the first indication or the second indication.

In one example, the UE may detect that the vehicle is travelling on the set of parallel roads based on information from the map data or based on recognition from the set of images, such as described in connection with FIG. 9. For example, at 932, the UE 902 may first detect that the UE 902 (or the vehicle associated with the UE 902) is travelling on a road where there is a set of roads parallel or in proximity to the road (which may be referred to as the "current road/path") travelled by the UE 902. The detection of that the vehicle is travelling on the set of parallel roads may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, the UE may receive, from a server, the map data containing the information related to the set of parallel roads.

In another example, the UE may capture the set of images via at least one camera, where the set of images may correspond to a field-of-view (FOV) of the vehicle, such as described in connection with FIG. 9. For example, at 920, the UE 902 may be configured to use at least one camera to capture video(s)/image(s) of the UE 902's surrounding. The capture of the set of images via at least one camera may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, the UE may fuse the set of images with the map data, where to detect the at least one traffic sign is present on the set of parallel roads based on the set of images and the map data, the UE may be configured to detect the at least one traffic sign is present on the set of parallel roads based on the fusion of the set of images with the map data. In some implementations, the UE may filter at least one second traffic sign based on at least one of: camera data or lane information, where the lane information includes at least one of current path information or upcoming path information.

In another example, the UE may detect the current path traveled by the vehicle, where the identification is further based on the detection of the current path, such as described in connection with FIG. 9. For example, at 932, the UE 902 may also be configured to detect a current path/road travelled by the UE 902. The detection of the current path traveled by the vehicle may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

In another example, the parallel roads correspond to at least two roads that are adjacent to each other with at least one different traffic rule.

In another example, the at least one traffic sign displays a speed limit for at least one road in the set of parallel roads.

In another example, the map data is high-definition (HD) map data.

Figure 12:
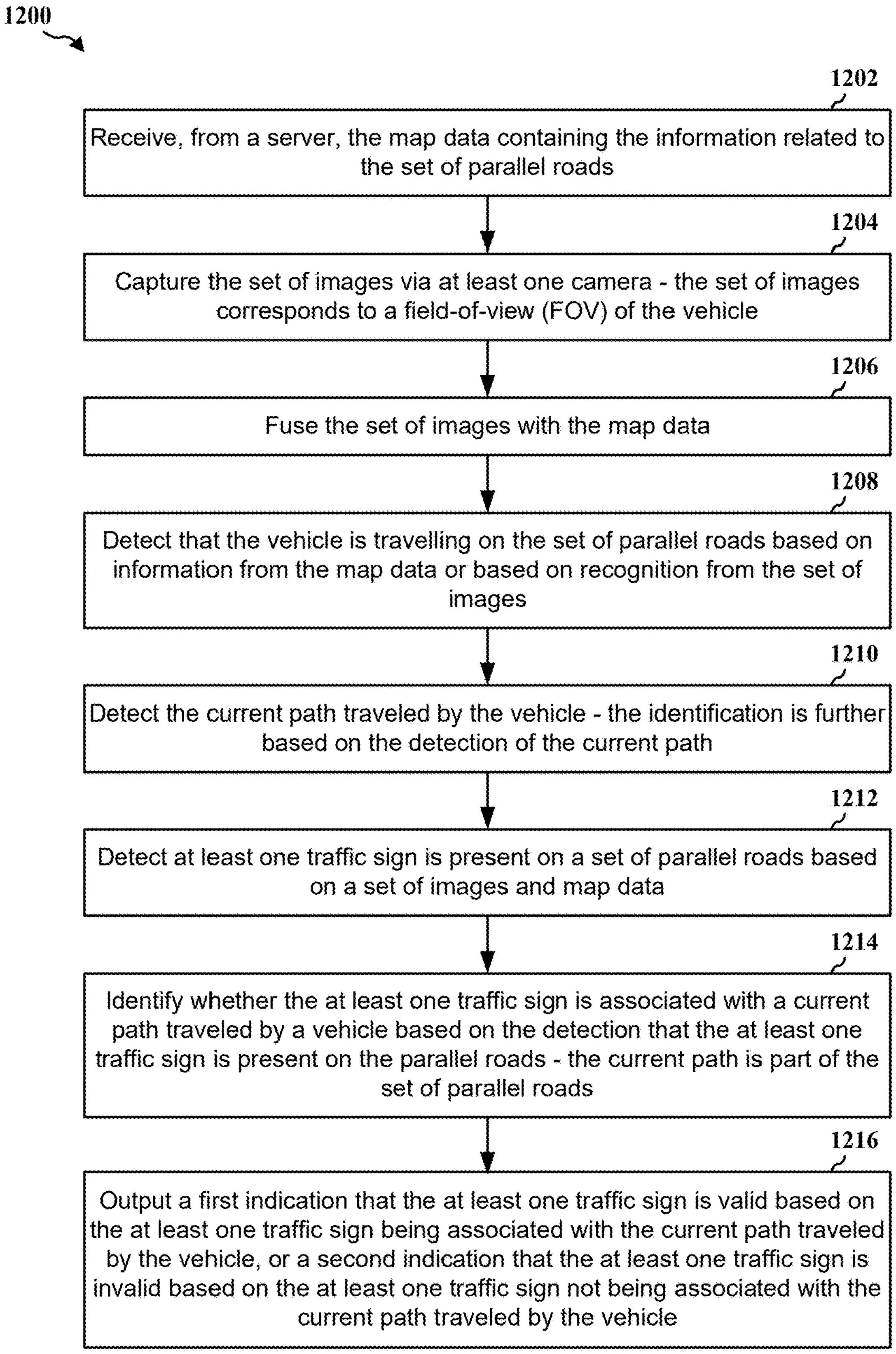
FIG. 12 is a flowchart of a method of object detection.

FIG. 12 is a flowchart 1200 of a method of object detection at a user equipment (UE). The method may be performed by a UE (e.g., the UE 104, 402, 502, 602, 902; the apparatus 1304). The method may enable the UE to obtain information related to parallel roads to improve the performance and accuracy of the UE on ruling out inapplicable/irrelevant traffic signs.

At 1212, the UE may detect at least one traffic sign is present on a set of parallel roads based on a set of images and map data, such as described in connection with FIG. 9. For example, at 926, based on the fused camera data and map data, the UE 902 may detect a set of traffic signs based on the fused camera data and map data. The detection of the at least one traffic sign may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

At 1214, the UE may identify whether the at least one traffic sign is associated with a current path traveled by a vehicle based on the detection that the at least one traffic sign is present on the parallel roads, where the current path is part of the set of parallel roads, such as described in connection with FIG. 9. For example, at 932, the UE 902 may be configured to mark one or more traffic signs as invalid/inapplicable signs if they are present on parallel roads but not related to the current path travelled by the UE 902 (and/or mark one or more traffic signs as valid/applicable signs if they are present on the parallel roads and are related to the current path travelled by the UE 902). For example, the UE 902 may first detect that the UE 902 (or the vehicle associated with the UE 902) is travelling on a road where there is a set of roads parallel or in proximity to the road (which may be referred to as the "current road/path") travelled by the UE 902 . . . and the UE 902 may identify/detect the current road/path it is using (e.g., such as based on a positioning mechanism) and label other road(s) in the parallel roads as invalid roads or roads not travelled by UE 902, etc. The identification of whether the at least one traffic sign is associated with a current path traveled by a vehicle may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

At 1216, the UE may output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle, such as described in connection with FIG. 9. For example, at 934, based on the filtering(s)/detection(s) performed at 928, 930, and/or 932, the UE 902 may identify whether one or more traffic signs (e.g., traffic signs that have not been filtered) are associated with the current path traveled by the UE 902 (or the vehicle associated with the UE 902). In some implementations, as shown at 940, the UE 902 may also be configured to output an indication of whether one or more traffic signs are valid/invalid. The output of the first indication and/or the second indication may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, to output the first indication that the at least one traffic sign is valid based on the at least one traffic sign being associated with the current path traveled by the vehicle, the UE may be configured to use the at least one traffic sign for at least one of speed detection, traffic information obtainment, navigation, autonomous driving, or assisted driving. In some implementations, to output the second indication that the at least one traffic sign is invalid based on the at least one traffic sign not being associated with the current path traveled by the vehicle, the UE may be configured to refrain from using or filtering the at least one traffic sign for at least one of speed detection, traffic information obtainment, navigation, autonomous driving, or assisted driving. In some implementations, to output the first indication or the second indication, the UE may be configured to transmit the first indication or the second indication, or store the first indication or the second indication.

In one example, as shown at 1208, the UE may detect that the vehicle is travelling on the set of parallel roads based on information from the map data or based on recognition from the set of images, such as described in connection with FIG. 9. For example, at 932, the UE 902 may first detect that the UE 902 (or the vehicle associated with the UE 902) is travelling on a road where there is a set of roads parallel or in proximity to the road (which may be referred to as the "current road/path") travelled by the UE 902. The detection of that the vehicle is travelling on the set of parallel roads may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, as shown at 1202, the UE may receive, from a server, the map data containing the information related to the set of parallel roads.

In another example, as shown at 1204, the UE may capture the set of images via at least one camera, where the set of images may correspond to a FOV of the vehicle, such as described in connection with FIG. 9. For example, at 920, the UE 902 may be configured to use at least one camera to capture video(s)/image(s) of the UE 902's surrounding. The capture of the set of images via at least one camera may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13. In some implementations, as shown at 1206, the UE may fuse the set of images with the map data, where to detect the at least one traffic sign is present on the set of parallel roads based on the set of images and the map data, the UE may be configured to detect the at least one traffic sign is present on the set of parallel roads based on the fusion of the set of images with the map data. In some implementations, the UE may filter at least one second traffic sign based on at least one of: camera data or lane information, where the lane information includes at least one of current path information or upcoming path information.

In another example, as shown at 1210, the UE may detect the current path traveled by the vehicle, where the identification is further based on the detection of the current path, such as described in connection with FIG. 9. For example, at 932, the UE 902 may also be configured to detect a current path/road travelled by the UE 902. The detection of the current path traveled by the vehicle may be performed by, e.g., the parallel road recognition component 198, the camera 1332, the ECU 1334, the one or more sensors 1318, the transceiver(s) 1322, the cellular baseband processor(s) 1324, and/or the application processor(s) 1306 of the apparatus 1304 in FIG. 13.

In another example, the parallel roads correspond to at least two roads that are adjacent to each other with at least one different traffic rule.

In another example, the at least one traffic sign displays a speed limit for at least one road in the set of parallel roads.

In another example, the map data is HD map data.

Figure 13:
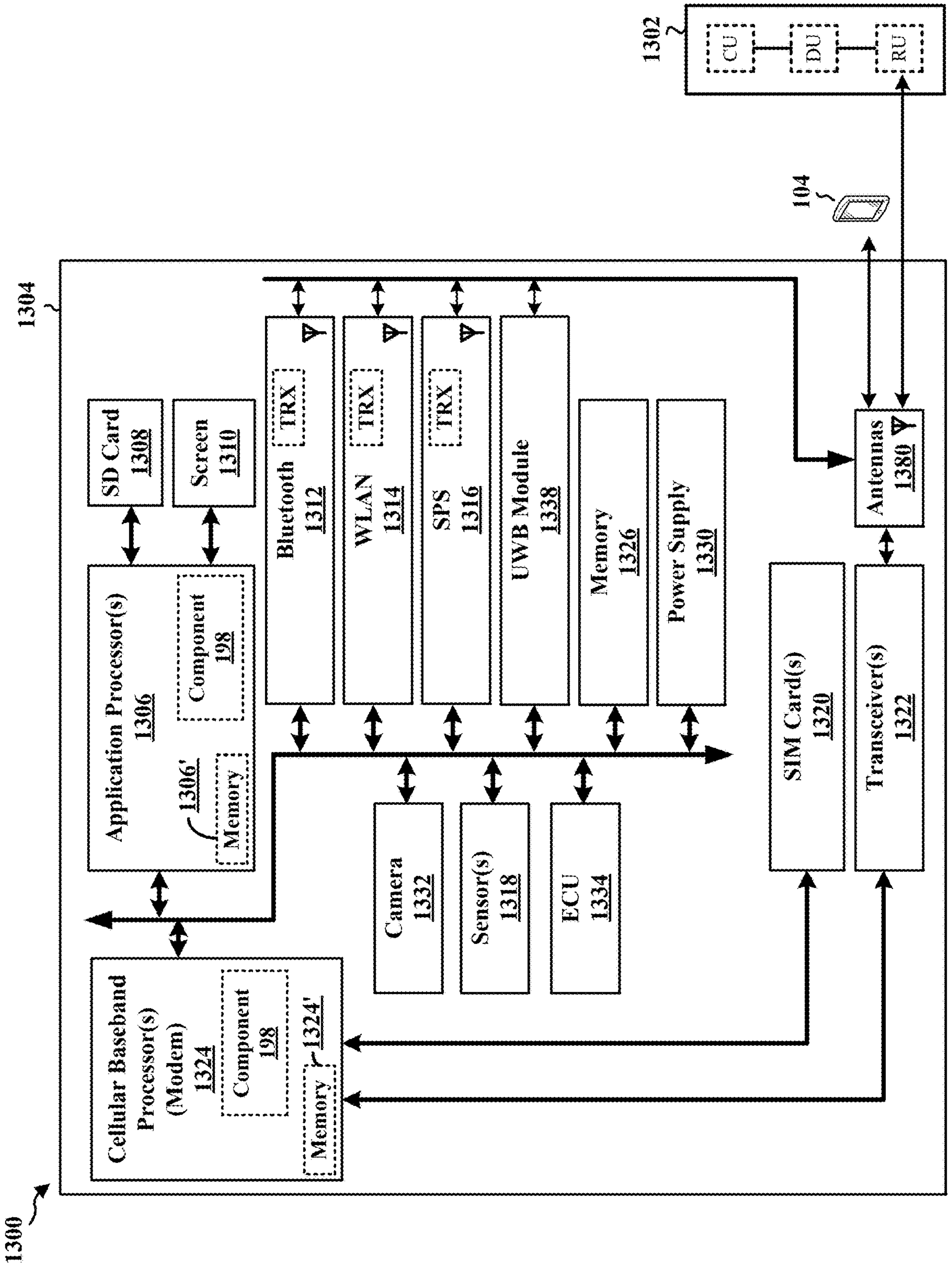
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an ultrawide band (UWB) module 1338, an SPS module 1316 (e.g., GNSS module), one or more sensors 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, a camera 1332, and/or an electronic control unit (ECU) 1334. The Bluetooth module 1312, the UWB module 1338, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 arc configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the parallel road recognition component 198 may be configured to detect at least one traffic sign is present on a set of parallel roads based on a set of images and map data. The parallel road recognition component 198 may also be configured to identify whether the at least one traffic sign is associated with a current path traveled by a vehicle based on the detection that the at least one traffic sign is present on the parallel roads, where the current path is part of the set of parallel roads. The parallel road recognition component 198 may also be configured to output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle. The parallel road recognition component 198 may be within the cellular baseband processor(s) 1324, the application processor(s) 1306, or both the cellular baseband processor(s) 1324 and the application processor(s) 1306. The parallel road recognition component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for detecting at least one traffic sign is present on a set of parallel roads based on a set of images and map data. The apparatus 1304 may further include means for identifying whether the at least one traffic sign is associated with a current path traveled by a vehicle based on the detection that the at least one traffic sign is present on the parallel roads, where the current path is part of the set of parallel roads. The apparatus 1304 may further include means for outputting a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

In some implementations, the means for outputting the first indication that the at least one traffic sign is valid based on the at least one traffic sign being associated with the current path traveled by the vehicle may include configuring the apparatus 1304 to use the at least one traffic sign for at least one of speed detection, traffic information obtainment, navigation, autonomous driving, or assisted driving. In some implementations, the means for outputting the second indication that the at least one traffic sign is invalid based on the at least one traffic sign not being associated with the current path traveled by the vehicle may include configuring the apparatus 1304 to refrain from using or filtering the at least one traffic sign for at least one of speed detection, traffic information obtainment, navigation, autonomous driving, or assisted driving. In some implementations, the means for outputting the first indication or the second indication may include configuring the apparatus 1304 to transmit the first indication or the second indication, or store the first indication or the second indication.

In one configuration, the apparatus 1304 may further include means for detecting that the vehicle is travelling on the set of parallel roads based on information from the map data or based on recognition from the set of images. In some implementations, the apparatus 1304 may further include means for receiving, from a server, the map data containing the information related to the set of parallel roads.

In another configuration, the apparatus 1304 may further include means for capturing the set of images via at least one camera, where the set of images may correspond to a FOV of the vehicle. In some implementations, the apparatus 1304 may further include means for fusing the set of images with the map data, where the means for detecting the at least one traffic sign is present on the set of parallel roads based on the set of images and the map data may include configuring the apparatus 1304 to detect the at least one traffic sign is present on the set of parallel roads based on the fusion of the set of images with the map data. In some implementations, the apparatus 1304 may further include means for filtering at least one second traffic sign based on at least one of: camera data or lane information, where the lane information includes at least one of current path information or upcoming path information.

In another configuration, the apparatus 1304 may further include means for detecting the current path traveled by the vehicle, where the identification is further based on the detection of the current path.

In another configuration, the parallel roads correspond to at least two roads that are adjacent to each other with at least one different traffic rule.

In another configuration, the at least one traffic sign displays a speed limit for at least one road in the set of parallel roads.

In another configuration, the map data is HD map data.

The means may be the parallel road recognition component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of object detection, comprising: detecting at least one traffic sign is present on a set of parallel roads based on a set of images and map data; identifying whether the at least one traffic sign is associated with a current path traveled by a vehicle based on the detection that the at least one traffic sign is present on the parallel roads, wherein the current path is part of the set of parallel roads; and outputting a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

Aspect 2 is the method of aspect 1, further comprising: detecting that the vehicle is travelling on the set of parallel roads based on information from the map data or based on recognition from the set of images.

Aspect 3 is the method of aspect 1 or aspect 2, further comprising: receiving, from a server, the map data containing the information related to the set of parallel roads.

Aspect 4 is the method of any of aspects 1 to 3, further comprising: capturing the set of images via at least one camera, wherein the set of images corresponds to a field-of-view (FOV) of the vehicle.

Aspect 5 is the method of any of aspects 1 to 4, further comprising: fusing the set of images with the map data, wherein detecting the at least one traffic sign is present on the set of parallel roads based on the set of images and the map data comprises detecting the at least one traffic sign is present on the set of parallel roads based on the fusion of the set of images with the map data.

Aspect 6 is the method of any of aspects 1 to 5, further comprising: filtering at least one second traffic sign based on at least one of: camera data or lane information, wherein the lane information includes at least one of current path information or upcoming path information.

Aspect 7 is the method of any of aspects 1 to 6, wherein outputting the first indication that the at least one traffic sign is valid based on the at least one traffic sign being associated with the current path traveled by the vehicle comprises: using the at least one traffic sign for at least one of speed detection, traffic information obtainment, navigation, autonomous driving, or assisted driving.

Aspect 8 is the method of any of aspects 1 to 7, wherein outputting the second indication that the at least one traffic sign is invalid based on the at least one traffic sign not being associated with the current path traveled by the vehicle comprises: refraining from using or filtering the at least one traffic sign for at least one of speed detection, traffic information obtainment, navigation, autonomous driving, or assisted driving.

Aspect 9 is the method of any of aspects 1 to 8, wherein the parallel roads correspond to at least two roads that are adjacent to each other with at least one different traffic rule.

Aspect 10 is the method of any of aspects 1 to 9, further comprising: detecting the current path traveled by the vehicle, wherein the identification is further based on the detection of the current path.

Aspect 11 is the method of any of aspects 1 to 10, wherein the at least one traffic sign displays a speed limit for at least one road in the set of parallel roads.

Aspect 12 is the method of any of aspects 1 to 11, wherein the map data is high-definition (HD) map data.

Aspect 13 is the method of any of aspects 1 to 12, wherein outputting the first indication or the second indication comprises: transmitting the first indication or the second indication; or storing the first indication or the second indication.

Aspect 14 is an apparatus for object detection, including: at least one memory; and at least one processor coupled to the at least one memory and, based at least in part on information stored in the at least one memory, the at least one processor, individually or in any combination, is configured to implement any of aspects 1 to 13.

Aspect 15 is the apparatus of aspect 14, further including at least one transceiver coupled to the at least one processor.

Aspect 16 is an apparatus for object detection, including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

What is claimed is:

1. An apparatus for object detection, comprising:

at least one memory; and at least one processor coupled to the at least one memory, the at least one processor is configured to:

capture a set of images via at least one camera, wherein the set of images corresponds to a field-of-view (FOV) of a vehicle;

fuse the set of images with map data;

detect at least one traffic sign is present on a set of parallel roads based on fusion of the set of images and the map data;

filter at least one second traffic sign based on at least one of: camera data or lane information, wherein the lane information includes at least one of current path information or upcoming path information;

identify whether the at least one traffic sign is associated with a current path traveled by the vehicle based on the detection that the at least one traffic sign is present on the set of parallel roads and based on filtering of the at least second traffic sign, wherein the current path is part of the set of parallel roads; and output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

2. The apparatus of claim 1, wherein the at least one processor is further configured to:

detect that the vehicle is travelling on the set of parallel roads based on information from the map data or based on recognition from the set of images.

3. The apparatus of claim 2, wherein the at least one processor is further configured to:

receive, from a server, the map data containing the information related to the set of parallel roads.

4. The apparatus of claim 1, wherein to output the first indication that the at least one traffic sign is valid based on the at least one traffic sign being associated with the current path traveled by the vehicle, the at least one processor is configured to:

use the at least one traffic sign for at least one of speed detection, traffic information obtainment, navigation, autonomous driving, or assisted driving.

5. The apparatus of claim 1, wherein to output the second indication that the at least one traffic sign is invalid based on the at least one traffic sign not being associated with the current path traveled by the vehicle, the at least one processor is configured to:

refrain from using or filtering the at least one traffic sign for at least one of speed detection, traffic information obtainment, navigation, autonomous driving, or assisted driving.

6. The apparatus of claim 1, wherein the set of parallel roads correspond to at least two roads that are adjacent to each other with at least one different traffic rule.

7. The apparatus of claim 1, wherein the at least one processor is further configured to:

detect the current path traveled by the vehicle, wherein identification is further based on the detection of the current path.

8. The apparatus of claim 1, wherein the at least one traffic sign displays a speed limit for at least one road in the set of parallel roads.

9. The apparatus of claim 1, wherein the map data is high-definition (HD) map data.

10. The apparatus of claim 1, further comprising at least one transceiver coupled to the at least one processor, wherein to output the first indication or the second indication, the at least one processor is configured to:

transmit, via the at least one transceiver, the first indication or the second indication; or store the first indication or the second indication.

11. A method of object detection, comprising:

capturing a set of images via at least one camera, wherein the set of images corresponds to a field-of-view (FOV) of a vehicle;

fusing the set of images with map data;

detecting at least one traffic sign is present on a set of parallel roads based on fusion of the set of images and the map data;

filtering at least one second traffic sign based on at least one of: camera data or lane information, wherein the lane information includes at least one of current path information or upcoming path information;

identifying whether the at least one traffic sign is associated with a current path traveled by the vehicle based on the detection that the at least one traffic sign is present on the set of parallel roads and based on filtering of the at least second traffic sign, wherein the current path is part of the set of parallel roads; and outputting a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

12. The method of claim 11, further comprising:

receiving, from a server, the map data containing information related to the set of parallel roads; and detecting that the vehicle is travelling on the set of parallel roads based on the information from the map data or based on recognition from the set of images.

13. The method of claim 11, wherein outputting the first indication that the at least one traffic sign is valid based on the at least one traffic sign being associated with the current path traveled by the vehicle comprises:

using the at least one traffic sign for at least one of speed detection, traffic information obtainment, navigation, autonomous driving, or assisted driving.

14. The method of claim 11, wherein outputting the second indication that the at least one traffic sign is invalid based on the at least one traffic sign not being associated with the current path traveled by the vehicle comprises:

refraining from using or filtering the at least one traffic sign for at least one of speed detection, traffic information obtainment, navigation, autonomous driving, or assisted driving.

15. The method of claim 11, further comprising:

detecting the current path traveled by the vehicle, wherein identification is further based on the detection of the current path.

16. A non-transitory computer-readable medium storing computer executable code, the code when executed by at least one processor causes the at least one processor to:

capture a set of images via at least one camera, wherein the set of images corresponds to a field-of-view (FOV) of a vehicle;

fuse the set of images with map data;

detect at least one traffic sign is present on a set of parallel roads based on fusion of the set of images and the map data;

filter at least one second traffic sign based on at least one of: camera data or lane information, wherein the lane information includes at least one of current path information or upcoming path information;

identify whether the at least one traffic sign is associated with a current path traveled by the vehicle based on the detection that the at least one traffic sign is present on the set of parallel roads and based on filtering of the at least second traffic sign, wherein the current path is part of the set of parallel roads; and output a first indication that the at least one traffic sign is valid based on the at least one traffic sign being associated with the current path traveled by the vehicle, or a second indication that the at least one traffic sign is invalid based on the at least one traffic sign not being associated with the current path traveled by the vehicle.

* * * * *